United States Patent
Werthman et al.

(10) Patent No.: US 9,765,872 B2
(45) Date of Patent: Sep. 19, 2017

(54) HYDROKINETIC TORQUE COUPLING DEVICE HAVING TURBINE-PISTON LOCKUP CLUTCH WITH DRIVE-CLUTCH COMPONENT, AND RELATED METHOD

(71) Applicant: VALEO EMBRAYAGES, Amiens (FR)

(72) Inventors: David Werthman, Royal Oak, MI (US); Sungchul Lee, Troy, MI (US); Michel Bacher, Marseilles (FR); Alexandre Depraete, Bloomfield, MI (US)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 14/522,361

(22) Filed: Oct. 23, 2014

(65) Prior Publication Data
US 2016/0116040 A1     Apr. 28, 2016

(51) Int. Cl.
*F16H 45/02* (2006.01)

(52) U.S. Cl.
CPC ..... *F16H 45/02* (2013.01); *F16H 2045/0226* (2013.01); *F16H 2045/0247* (2013.01);
(Continued)

(58) Field of Classification Search
CPC ............. F16H 45/02; F16H 2045/0226; F16H 2045/0289; F16H 2045/0263;
(Continued)

(56) References Cited

U.S. PATENT DOCUMENTS 2,130,895 A   9/1938   Ness
2,860,747 A   11/1958  Kelley
(Continued)

FOREIGN PATENT DOCUMENTS

DE   1550957 A1   7/1969
DE   2245901 A1   4/1974
(Continued)

OTHER PUBLICATIONS

U.S. Appl. No. 14/510,244, filed Oct. 9, 2014, First Named Inventor: Alexandre Depraete.
(Continued)

*Primary Examiner* — Richard Lorence
*Assistant Examiner* — Lillian Nguyen
(74) *Attorney, Agent, or Firm* — Berenato & White, LLC

(57) ABSTRACT

A hydrokinetic torque coupling device includes an impeller, a casing having a first engagement surface, a damper assembly, a turbine-piston and a drive-clutch component non-moveably attached to the turbine-piston and having a second engagement surface. The turbine-piston is axially displaceable relative to the casing to move the second engagement surface axially towards and away from the first engagement surface for positioning the hydrokinetic torque coupling device respectively into and out of a lockup mode in which the first and second engagement surfaces frictionally interlock with one another to mechanically lock the casing non-rotatably relative to the input part of the damper assembly. The drive-clutch component is configured to engage and rotationally drive a torsional vibration damper.

19 Claims, 19 Drawing Sheets

(52) U.S. Cl.
CPC ............... *F16H 2045/0263* (2013.01); *F16H 2045/0278* (2013.01); *F16H 2045/0289* (2013.01); *F16H 2045/0294* (2013.01)

(58) Field of Classification Search
CPC ..... F16H 2045/0294; F16H 2045/0205; F16H 2045/0273; F16H 2045/0278; F16H 2045/0247; F16D 13/38; F16D 33/18
See application file for complete search history.

(56) References Cited

U.S. PATENT DOCUMENTS

| | | | |
|---|---|---|---|
| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,083,029 | B2 | 8/2006 | Seebacher et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 8,479,901 | B2 | 7/2013 | Engelmann |
| 2002/0027053 | A1* | 3/2002 | Back ............ F16H 45/02 192/3.3 |
| 2003/0168298 | A1 | 9/2003 | Holler et al. |
| 2003/0168299 | A1 | 9/2003 | Holler et al. |
| 2004/0011032 | A1 | 1/2004 | Holler et al. |
| 2006/0086584 | A1 | 4/2006 | Maucher et al. |
| 2009/0020385 | A1 | 1/2009 | Nakamura |
| 2010/0236228 | A1 | 9/2010 | Degler |
| 2012/0241273 | A1 | 9/2012 | Kawahara |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0362041 | A1 | 12/2015 | Lee et al. |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Machine Translation of EP 0125428 downloaded from EPO.org on Jul. 22, 2016.

* cited by examiner

HYDROKINETIC TORQUE COUPLING DEVICE HAVING TURBINE-PISTON LOCKUP CLUTCH WITH DRIVE-CLUTCH COMPONENT, AND RELATED METHOD

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect comprises an impeller including an impeller shell and a plurality of impeller blades, a casing including the impeller shell and a cover shell connected to the impeller shell, an axially displaceable turbine-piston coaxially aligned with and drivable hydrodynamically by the impeller and including a turbine-piston shell, and a drive-clutch component affixed to the turbine-piston shell and including a drive portion and a clutch portion. The casing has a first engagement surface, while the clutch portion of the drive-clutch component has a second engagement surface movable axially toward and away from the first engagement surface. The turbine-piston is axially displaceable relative to the casing to move the first engagement surface axially towards and away from the second engagement surface for positioning the hydrokinetic torque coupling device respectively into and out of a lockup mode in which the first and second engagement surfaces frictionally interlock with one another to mechanically lock the casing non-rotatably relative to the drive-clutch component. The drive-clutch component is configured to engage and rotationally drive a torsional vibration damper.

A second aspect of the invention provides a method of assembling a hydrokinetic torque coupling device. A method involves the steps of providing a torque converter including an impeller having an impeller shell and an axially displaceable turbine-piston including a turbine-piston shell, providing a drive-clutch component including a drive portion and a clutch portion, the clutch portion of the drive-clutch component having a second engagement surface configured to engage a first engagement surface of a cover shell, providing a torsional vibration damper, fixedly attaching the drive portion of the drive-clutch component to the turbine-piston shell, mounting the torsional vibration damper so that the drive-clutch component drivingly engages the torsional vibration damper, and non-moveably attaching the cover shell to the impeller shell so as to form a casing enclosing the torque converter, the drive-clutch component and the torsional vibration damper.

A third aspect of the invention also provides a method of assembling a hydrokinetic torque coupling device. A method involves providing a torque converter including an impeller having an impeller shell, an axially displaceable turbine-piston including a turbine-piston shell, and a drive-clutch component non-moveably attached to the turbine-piston shell and having a second engagement surface. The torque converter is operatively connected to a cover shell having a first engagement surface, and a damper assembly including an input part and an output part operatively connectable to an output hub. The turbine-piston is axially displaceable relative to the cover shell to move the second engagement surface axially towards and away from the first engagement surface for positioning the hydrokinetic torque coupling device respectively into and out of a lockup mode in which the first and second engagement surfaces frictionally interlock with one another to mechanically lock the casing non-rotatably relative to the input part of the damper assembly.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
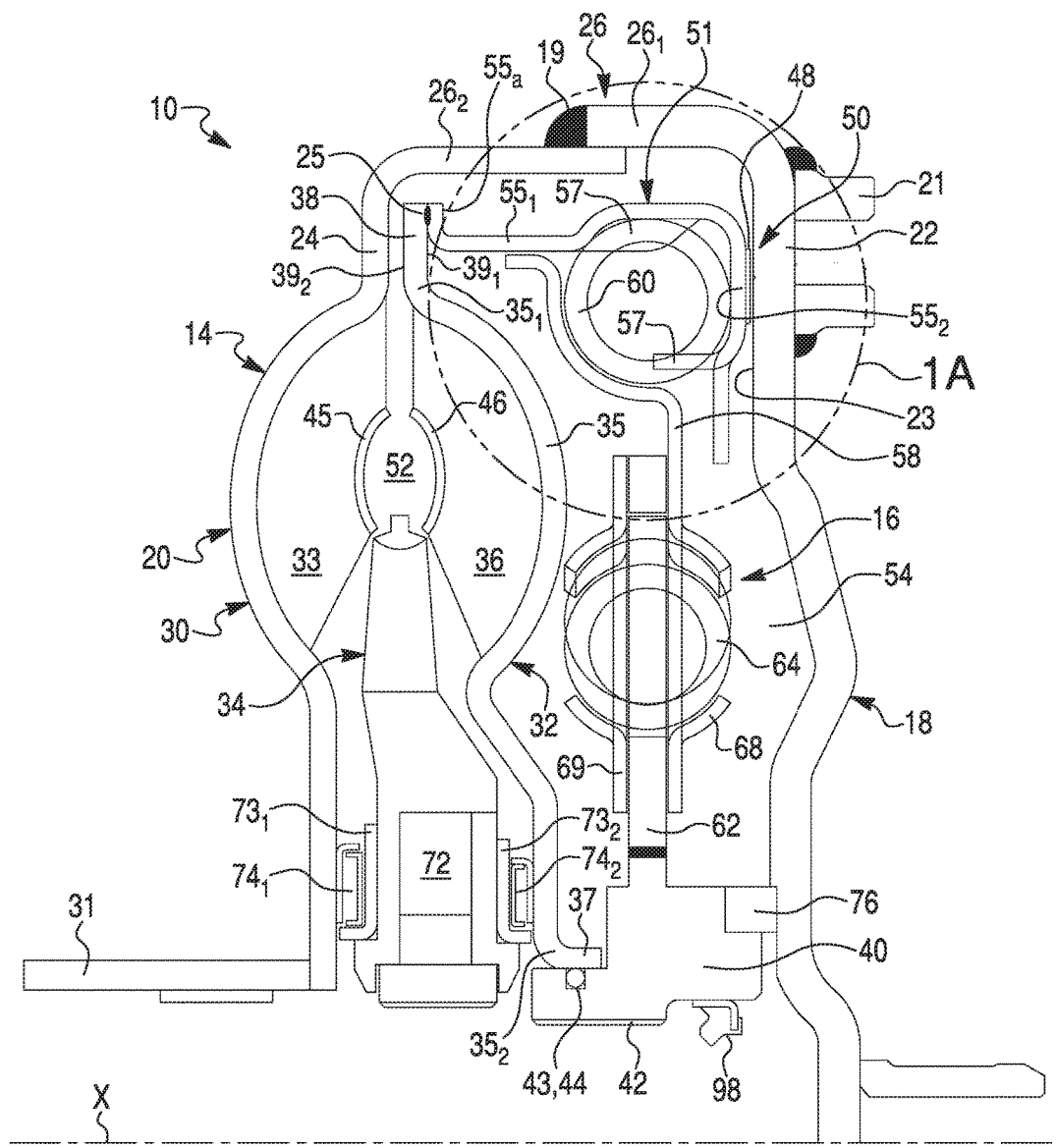
FIG. 1 is a fragmented half-view in axial cross section of a hydrokinetic torque coupling device equipped with a turbine-piston in accordance with a first exemplary embodiment of the present invention in a lockup mode.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling device 10 above rotational axis X. Generally, the torque coupling device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell (or cover shell) 18 and a second casing shell (or impeller shell) 20 non-movably interconnected sealingly together, such as by weld connection 19 at their outer peripheries. The first shell 18 is non-movably interconnected to the driving shaft, more typically a flywheel (not shown)

that is fixed to and non-rotatable relative to the driving shaft, so that the casing 12 turns at the same speed that the engine operates. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The first sidewall portion 22 includes a first engagement surface 23 extending substantially radially relative to the direction from the rotational axis X and facing the second sidewall portion 24. The first and second outer wall portions $26_1$, $26_2$ collectively establish an annular outer wall 26 substantially parallel to the rotation axis X. The weld connection 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly/hydrodynamically coupled to one another as known in the art.

The second casing shell 20 of the casing 12 also forms and serves as the impeller shell of the impeller 30. The impeller 30 further includes a core ring 45, and a plurality of impeller blades 33 fixedly attached, such as by brazing, to the impeller shell 20. The impeller 30, including the impeller shell 20, the core ring 45, and the blades 33, is non-rotatably secured to the casing 12 and hence to the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

The torque coupling device 10 further includes an output hub (also referred to as a hub) 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 98, mounted to a radially inner peripheral surface of the output hub 40, creates a seal at the interface of the transmission input shaft and the output hub 40, as best shown in FIG. 1.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35.

The impeller shell 20 and the turbine-piston shell 35 collectively define a substantially toroidal first chamber (or torus chamber) 52 therebetween. Referring to FIG. 1, the torus chamber 52 is to the left side of the turbine-piston shell 35, and a second (or damper) chamber 54 is to the other (right) side of the turbine-piston shell 35. In other words, the first chamber 52 is defined between the impeller shell 20 and the turbine-piston shell 35, while the second chamber 54 is defined between the turbine-piston shell 35 and the first casing shell 18.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side bearing ring 73 of the stator 34 and the impeller shell 20 of the casing 12.

Extending axially at a radially inner peripheral end $35_2$ of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the output hub 40 along this interface. Although not shown, a bearing may be placed at the interface of the flange 37 and the output hub 40.

The piston component of the turbine-piston 32 includes a substantially annular, planar (i.e., flat) turbine-piston flange (or turbine-piston wall) 38 extending radially outwardly from a radially outer peripheral end $35_1$ of the turbine-piston shell 35. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end of the turbine-piston shell 35 radially outward, transverse to rotational axis X, to terminate at an end in spaced relationship to the inner peripheral surface of the annular outer wall portion 26 of the casing 12. The turbine-piston flange 38 has two axially opposite planar surfaces: a first surface $39_1$ facing the first casing shell 18, and a second surface $39_2$ facing the second casing shell 20.

A drive-clutch component 51 is affixed (i.e., non-moveably attached) to the turbine-piston shell 35, such as by an annular weld 25 and/or fasteners near a radially distal end of the turbine-piston flange 38 of the turbine-piston 32. The drive-clutch component 51 includes an axially extending tubular drive portion $55_1$ and a substantially radially extending annular clutch portion $55_2$ extending substantially radially downward from the tubular drive portion $55_1$. More specifically, an axially inner distal end 55a of the drive portion $55_1$ of the drive-clutch component 51 is in the form of a flange extending radially outwardly from the drive portion $55_1$ and fixedly connected to the first surface $39_1$ of the turbine-piston flange 38 of the turbine-piston 32, such as by the weld 25 or fasteners. The weld may comprise a continuous welding bead in order to avoid any leaks in this area.

Although the drive and clutch portions $55_1$ and $55_2$ are embodied as integral with one another, e.g., made by metal stamping as a single or unitary component, the drive and clutch portions $55_1$ and $55_2$ may be separate components integrally connected together, such as by fasteners. As best shown in FIG. 1, the clutch portion $55_2$ of the drive-clutch component 51 has a second engagement surface 53 that faces the first engagement surface 23 of the casing 12.

Figure 1A:
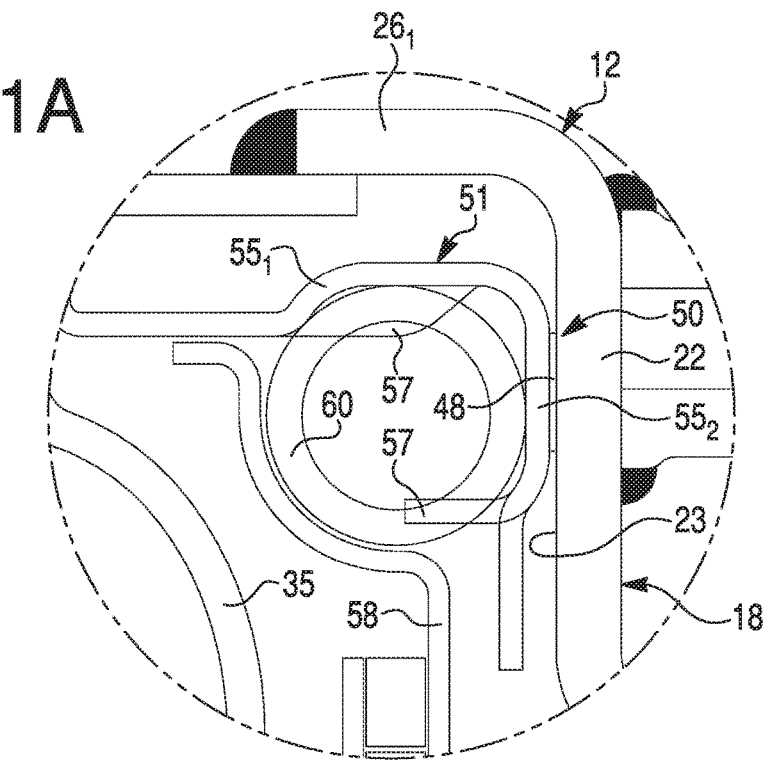
FIG. 1A is an enlarged fragmentary view of circle 1A of FIG. 1 in the lockup mode.
Figure 1B:
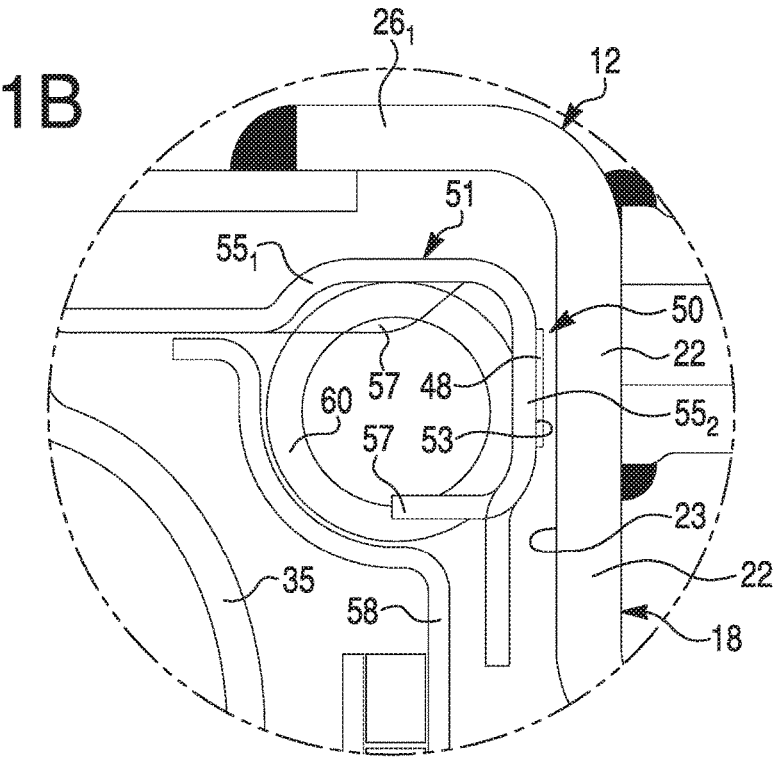
FIG. 1B is the same enlarged fragmentary view of circle 1A of FIG. 1, but with the first exemplary embodiment shown in a non-lockup mode.

In accordance with the first exemplary embodiment, the second engagement surface 53 of the clutch portion $55_2$ of the drive-clutch component 51 is provided with a friction ring (or friction lining) 48, best shown in FIG. 1B, which shows a lockup clutch 50 in a lockup mode (best shown in FIG. 1A). The friction ring 48 may be secured to the engagement surface 53, for example, by adhesive bonding and/or with fasteners, as best shown in FIG. 1B. The friction ring 48 is made of a friction material for improved frictional performance. Alternatively, a friction ring (or friction lining) 48 may be secured to the first engagement surface 23 of the casing 12. According to still another embodiment, a first friction ring or liner is secured to the first engagement surface 23 of the casing 12 and a second friction ring or liner is secured to the second engagement surface 53 of the drive-clutch component 51. It is within the scope of the invention to omit one or both of the friction rings. In other words, the friction linings/rings 48 may be secured to any, all, or none of the engagement surfaces.

Further according with the first exemplary embodiment, the second engagement surface 53 of the drive-clutch component 51 is slightly conical to improve the engagement of the lock-up clutch 50. Specifically, the engagement surface 53 of the drive-clutch component 51 holding the friction lining 48 is conical at an angle between 10° and 30° to improve the torque capacity of the lock-up clutch 50. Alternatively, the engagement surface 53 of the drive-clutch component 51 may be parallel to the engagement surface 23 of the casing 12.

In the first embodiment, the drive portion 5 is shown extending from the turbine-piston shell 35 axially towards the torsional vibration damper 16. The drive-clutch component 51 axially overlaps and engages the torsional vibration damper 16, irrespective of whether the drive-clutch component 51 is in or out of lockup mode. In both modes, the drive portion $5_{51}$, of the drive-clutch component 51 is configured to rotationally drive the torsional vibration damper 16 and the output hub 40.

The torsional vibration damper 16 is housed in the casing 12 axially between the turbine-piston 32 and the first casing shell 18, as shown in FIG. 1. The drive-clutch component 51 serves as an input for the torsional vibration damper 16. For this reason, the drive-clutch component 51 includes drive tabs 57. The torsional vibration damper 16 further includes a plurality of first (or radially outer) circumferential elastic damping members 60, an intermediate member 58 drivenly coupled to the drive tabs 57 of the drive-clutch component 51 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs oriented substantially circumferentially about the rotational axis X. Other elastic members may be selected to replace or supplement the springs.

The driving tabs 57 of the drive and clutch portions $55_1$ and $55_2$ of the drive-clutch component 51 extend axially and/or radially in the direction toward the torsional vibration damper 16 and drivingly engage the first circumferential damping members 60 thereof. The driving tabs 57 are circumferentially equidistantly spaced from one another to engage circumferential ends of the first damping members 60. Therefore, the drive-clutch component 51 is a consolidation or incorporation of a clutch component with an input part of the torsional vibration damper 16. The intermediate member 58 of the torsional vibration damper 16 has a plurality of driven tabs extending toward and drivingly engaging the first circumferential damping members 60. The driven tabs of the intermediate member 58 are circumferentially equidistantly spaced from one another, and engage the opposite circumferential ends of the first damping members 60 and the driving tabs 57. The intermediate member 58 of the torsional vibration damper 16 is rotatable relative to the drive-clutch component 51 due to elasticity of the first damping members 60, which absorb torsional vibration.

Additionally, the drive-clutch component 51 is axially movable relative to the first damping members 60 and the intermediate member 58, thus relative to the torsional vibration damper 16. This relative axial movement may become necessary during axial movement of the turbine-piston shell 35. When the turbine-piston shell 35 shifts axially due to a lockup event, which is discussed further below, the drive-clutch component 51 with the driving tabs 57 move axially relative to the intermediate member 58. Thus, the drive-clutch component 51 is both axially and circumferentially moveable relative to the intermediate member 58, and generally to the torsional vibration damper 16.

The intermediate member 58 is formed by a first disk part 68 on a first side of the second damping members 64. The first disk part 68 is non-moveably secured to a second disk part 69 on the opposite side of the second damping members 64, such as by rivets. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

As best shown in FIG. 1, the output hub 40 and driven member 62 are preferably integral with one another. Alternatively, the driven member 62 may be non-integrally connected to the output hub 40. The non-rotatable connection between the driven member 62 and the output hub 40 may be formed by splines or welding. A thrust bearing 76 is positioned between the output hub 40 and the first casing shell 18.

The turbine-piston 32 is axially displaceable to move the engagement surface 53 of the clutch portion $55_2$ of the drive-clutch component 51 axially towards and away from the engagement surface 23 of the casing 12 for positioning the hydrokinetic torque coupling device 10 respectively into and out of a lockup mode in which the casing 12 is mechanically locked to the input part of the torsional vibration damper 16. Axial movement of the turbine-piston 32 is accomplished by changing the pressure differential between the opposite sides of the turbine-piston shell 35. Referring to FIG. 1, the torus chamber 52 is to the left side of the turbine-piston shell 35 (as illustrated in FIG. 1), and the damper chamber 54 is to the other (right) side of the turbine-piston shell 35 (as illustrated in FIG. 1). A pressure increase in the damper chamber 54 relative to the torus chamber 52 (or stated differently a pressure decrease in the torus chamber 52 relative to the damper chamber 54) shifts the turbine-piston shell 35 axially in the direction of torque transmission, i.e., towards the output side of the casing 12, that is right to left in FIG. 1, into lockup mode. On the other hand, a pressure decrease in the damper chamber 54 relative to the torus chamber 52 (or stated differently a pressure increase in the torus chamber 52 relative to the damper chamber 54) shifts the turbine-piston shell 35 axially against the direction of torque transmission, i.e., towards the input side of the casing, that is left to right in FIG. 1, out of lockup mode. Pressure changes are created by control of the fluid, e.g., hydraulic fluid or oil, in the chambers 52 and 54.

In the lockup mode, the turbine-piston shell 35 is displaced axially towards the first sidewall portion 22 of the first casing shell 18 until the frictional ring 48 of the engagement surface 53 of the drive-clutch component 51 (which moves axially with the turbine-piston shell 35) abuts against and is non-rotatably frictionally coupled to the engagement surface 23 of the casing 12. In the lockup mode, torque is transferred from the engine to the casing 12, then by way of the frictional engagement between surfaces 23 and 53 (or the frictional lining 48 thereof) to the torsional vibration damper 16 and the output hub 40. Thereby, the drive-clutch component 51 and the casing 12 together create a lockup clutch 50 that bypasses the hydrodynamic fluid coupling of the torque converter 14 and mechanically non-rotatably couples the driving and driven shafts. Notably, the contact between the engagement surfaces 23 and 53 (or the frictional lining 48) in the lockup mode creates a fluid seal, sealing the torus chamber 52 and the damper chamber 54 from one another.

In the non-lockup position, the turbine-piston 32 is displaced axially away from the first sidewall portion 22 of the first casing shell 18, axially moving the drive-clutch component 51 affixed thereto until the engagement surface 53 of the clutch portion $55_2$ of the drive-clutch component 51 (or the frictional lining 48 thereof) is spaced from and no longer non-rotatably frictionally coupled to the engagement surface 23 of the casing 12. Thus, torque transferred from the engine to the casing 12 does not bypass the torque converter 14 through the lockup clutch. Notably, in the non-lockup mode an open fluid passage is established between the engagement surface 23 of the casing 12 and the engagement surface 53 of the clutch portion $55_2$ of the drive-clutch component 51. Hydraulic fluid is free to flow between the torus chamber 52 and the damper chamber 54 through the passage.

Torque received by the locked-up drive-clutch component 51 is transmitted through the torsional vibration damper 16 to the output hub 40, which is connected to the driven shaft, such as by splines 42. As the turbine-piston 32 and the drive-clutch component 51 move axially into lockup position as described above, the driving tabs 57 of the drive-clutch component 51 are axially displaced relative to the first damping members 60 and the intermediate member 58 of the torsional vibration damper 16. The relative axial movement between the drive-clutch component 51 and the first damping members 60 allows the intermediate member 58, second damping members 64, and the driven member 62, i.e. the torsional vibration damper 16, to remain fixed axially on the output hub 40 while the turbine-piston shell 35 and the drive-clutch component 51 move in the axial direction.

In operation, the lockup clutch is generally activated after the hydraulic coupling of the driving and driven shafts, typically at relatively high speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a leaf spring, may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the torque hydrokinetic torque coupling device 10. This space-saving structure provides several design enhancements. For example, the hydrokinetic torque coupling device 10 can be made smaller and lighter. Alternatively, the free space within the casing 12 can be used to add additional components, such as damping components. Additionally, and as discussed in greater detail below, the drive-clutch component 51 simplifies assembly of the hydrokinetic torque coupling device 10.

Various modifications, changes, and alterations may be practiced with the above-described embodiment. The features of the embodiments described herein may be practice with one another and are substitutable in numerous combinations.

Various modifications, changes, and alterations may be practiced with the above-described embodiment, including but not limited to the additional embodiments shown in FIG. 1. In the interest of brevity, reference characters that are discussed above in connection with FIG. 1 are not further elaborated upon below in FIGS. 2-21, except to the extent necessary or useful to explain the additional embodiments of FIG. 1. Modified components and parts are indicated by the addition of a hundred digit for the second embodiment, two hundreds digit for the third embodiment, etc., to the reference numeral. For example, the drive-clutch component 51 of FIG. 1 is modified in FIGS. 2, 3A and 3B, and thus is designated by reference numeral 151.

Figure 2:
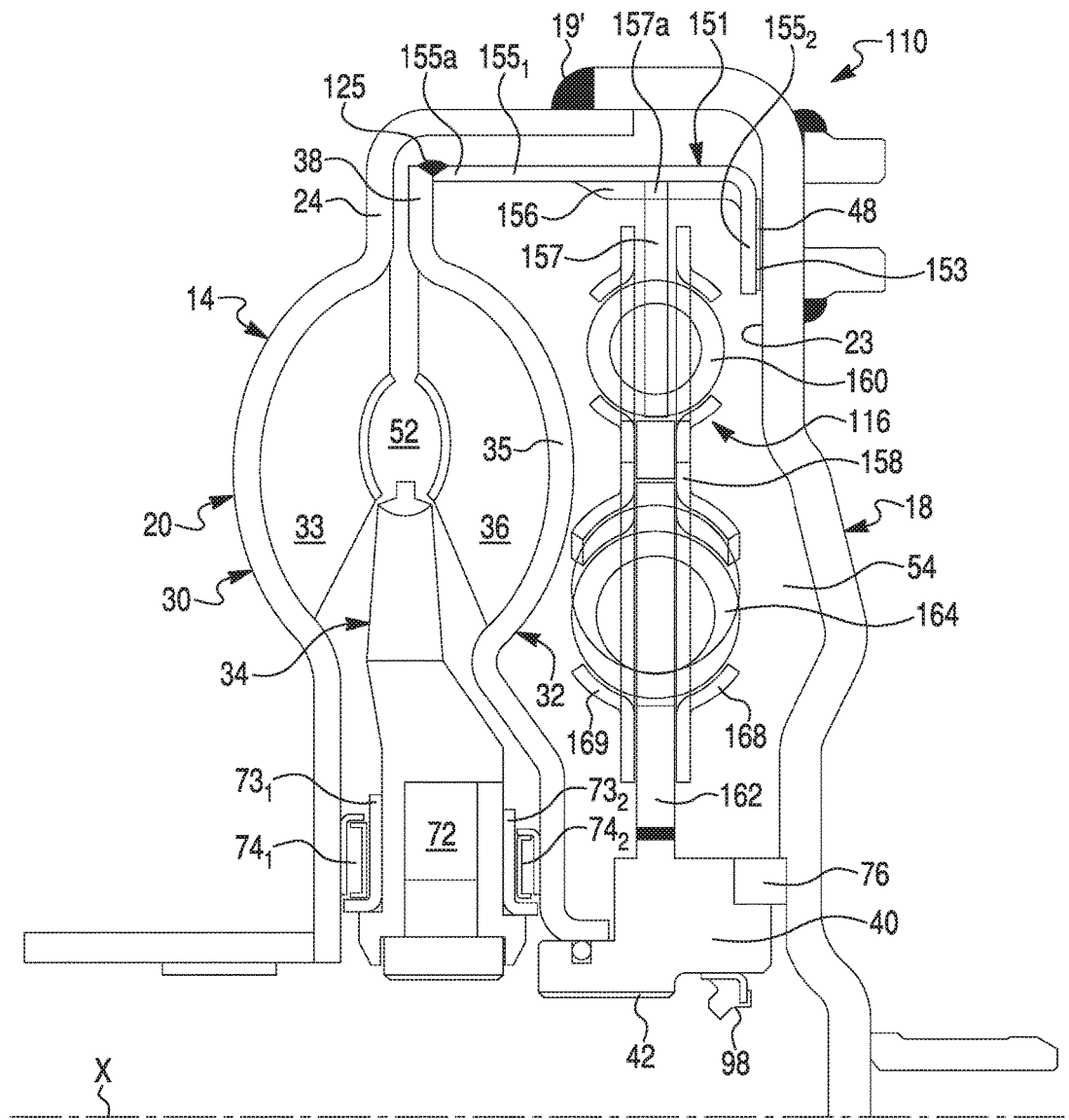
FIG. 2 is a fragmented half-view in axial section of a hydrokinetic torque coupling device equipped with a turbine-piston in accordance with a second exemplary embodiment of the present invention in a lockup mode.
Figure 3A:
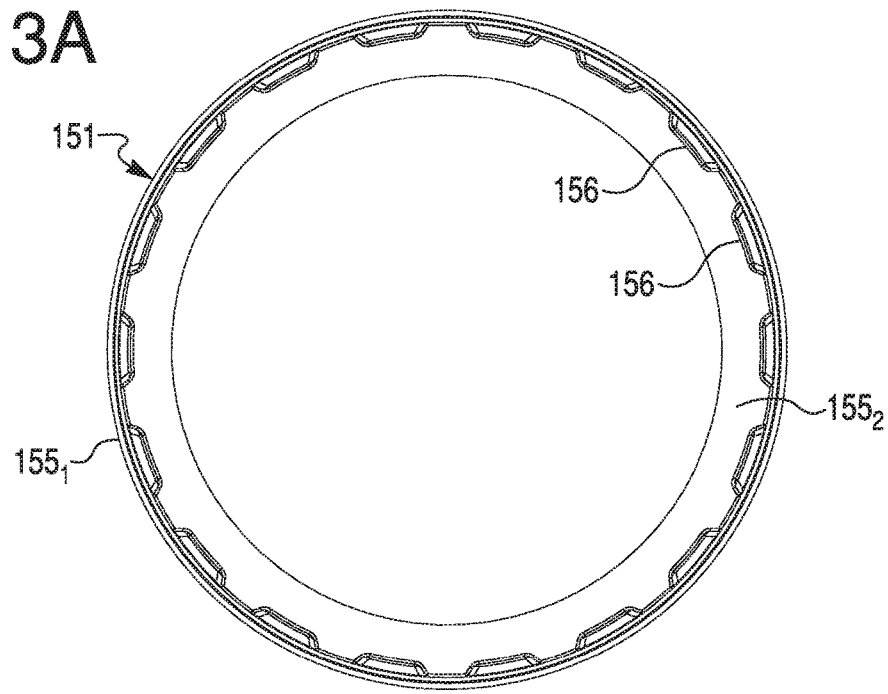
FIG. 3A is a front view of a drive-clutch component of the torque coupling device of FIG. 2.
Figure 3B:
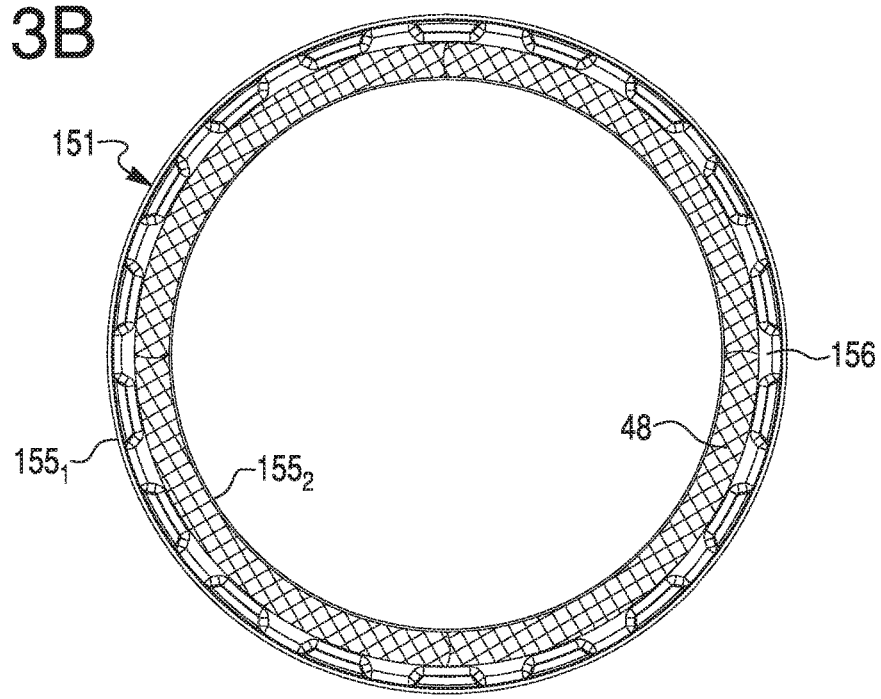
FIG. 3B is a rear view of the drive-clutch component of the torque coupling device of FIG. 2.

In a hydrokinetic torque coupling device 110 of a second embodiment illustrated in FIGS. 2, 3A and 3B, a drive-clutch component 151 is affixed (i.e., non-moveably attached, or fixed) to the turbine-piston shell 35, such as by an annular weld 125 near a radially distal end of the turbine-piston flange 38 of the turbine-piston 32. The drive-clutch component 151 includes an axially extending tubular drive portion $155_1$ and a substantially radially extending annular clutch portion $155_2$ extending substantially radially downward from the tubular drive portion $155_1$. An engagement surface 153 of the clutch portion $155_2$ of the drive-clutch component 151 is provided with a friction ring (or friction lining) 48, as best shown in FIG. 3B. More specifically, an axially inner distal end $155a$ of the drive portion $155_1$ of the drive-clutch component 151 is fixedly connected to the first surface $39_1$ of the turbine-piston flange 38 of the turbine-piston 32, such as by the butt-weld connection 125.

The welding bead is preferably continuous in order to avoid leaks in this area. The axially extending tubular drive portion $155_1$ of the drive-clutch component 151 is provided with inner splines 156 facing torsional vibration damper 116, best shown in FIG. 3A.

The torsional vibration damper 116 is housed in the casing 12 axially between the turbine-piston 32 and the first casing shell 18, as best shown in FIG. 2. The torsional vibration damper 116 includes an input member 157 operatively connected to the axially extending tubular drive portion 1551 of the drive-clutch component 151, so that the drive-clutch component 151 rotationally drives the torsional vibration damper 116. Specifically, the input member 157 of the torsional vibration damper 116 is formed with teeth 157a on an outer peripheral surface thereof, which are complementary to the splines 156 of the drive-clutch component 151. The teeth 157a of the input member 157 non-rotatably and axially slidably engage the complementary splines 156 of the drive-clutch component 151. Accordingly, the input member 157 of the torsional vibration damper 116 is non-rotatable but axially slidable relative to the axially extending tubular drive portion $155_1$ of the drive-clutch component 151 to allow the torsional vibration damper 116 to remain axially fixed relative to the output hub 40 and the casing 12 as the drive-clutch component 151 is displaced axially by the turbine-piston 32 moving in and out of the lockup mode.

The torsional vibration damper 116 further includes a plurality of first (or radially outer) circumferential elastic damping members 160, an intermediate member 158 drivingly coupled to the input member 157 through the first circumferential damping members 160, a plurality of second (or radially inner) circumferential elastic damping members 164, and a driven (or output) member 162 drivingly coupled to the intermediate member 158 through the second circumferential damping members 164. The first circumferential damping members 160 are radially outward from the second circumferential damping members 164. According to the exemplary embodiment of FIG. 2, the first and second damping members 160, 164 are configured as helical (or coil) springs oriented substantially circumferentially about the rotational axis X. Other elastic members may be used to replace or supplement the first and second damping members 160, 164.

The input member 157 has driving tabs drivingly engaging the first damping members 60. The intermediate member 158 of the torsional vibration damper 116 has driven tabs drivingly engaging opposite circumferential ends of the first damping members 160 and the driving tabs of the input member 157. The intermediate member 158 of the torsional vibration damper 116 is rotatable relative to the input member 157 due to elasticity of the first damping members 160, which absorb torsional vibration.

The drive-clutch component 151 is axially movable relative to the input member 157, thus relative to the torsional vibration damper 116. This relative axial movement may become necessary during axial movement of the turbine-piston shell 35. When the turbine-piston shell 35 shifts axially due to a lockup event, the drive-clutch component 151 moves axially relative to the input member 157 of the torsional vibration damper 116 due to the splined connection between the drive-clutch component 151 and the input member 157 of the torsional vibration damper 116. Thus, the drive-clutch component 151 is axially moveable relative to the torsional vibration damper 116 to allow the torsional vibration damper 116 to remain axially fixed relative to the output hub 40 and the casing 12 as the drive-clutch component 151 is displaced axially by the turbine-piston 32 moving in and out of the lockup mode.

The intermediate member 158 of the torsional vibration damper 116 includes first and second intermediate disk parts 168, 169 non-moveably connected to one another, such as by rivets. The first and second disk parts 168, 169 establish an input part to the second damping members 164. The driven member 162 establishes an output part of the second damping members 164. The driven member 162 has windows into which the second damping members 164 are set. The disk parts 168, 169 engage first ends of the second damping members 164, and the driven member 162 engages second ends of the second damping members 164. The disk parts 168, 169 of the intermediate member 158 are thus rotatable relative to the driven member 162, with the second damping members 164 absorbing torsional vibration due to their elasticity.

As best shown in FIG. 2, the output hub 40 and driven member 162 are preferably integral with one another. Alternatively, the driven member 162 may be non-integrally connected to the output hub 40. The non-rotatable connection between the driven member 162 and the output hub 40 may be formed by splines or welding. A thrust bearing 76 is positioned between the output hub 40 and the first casing shell 18.

Figure 4:
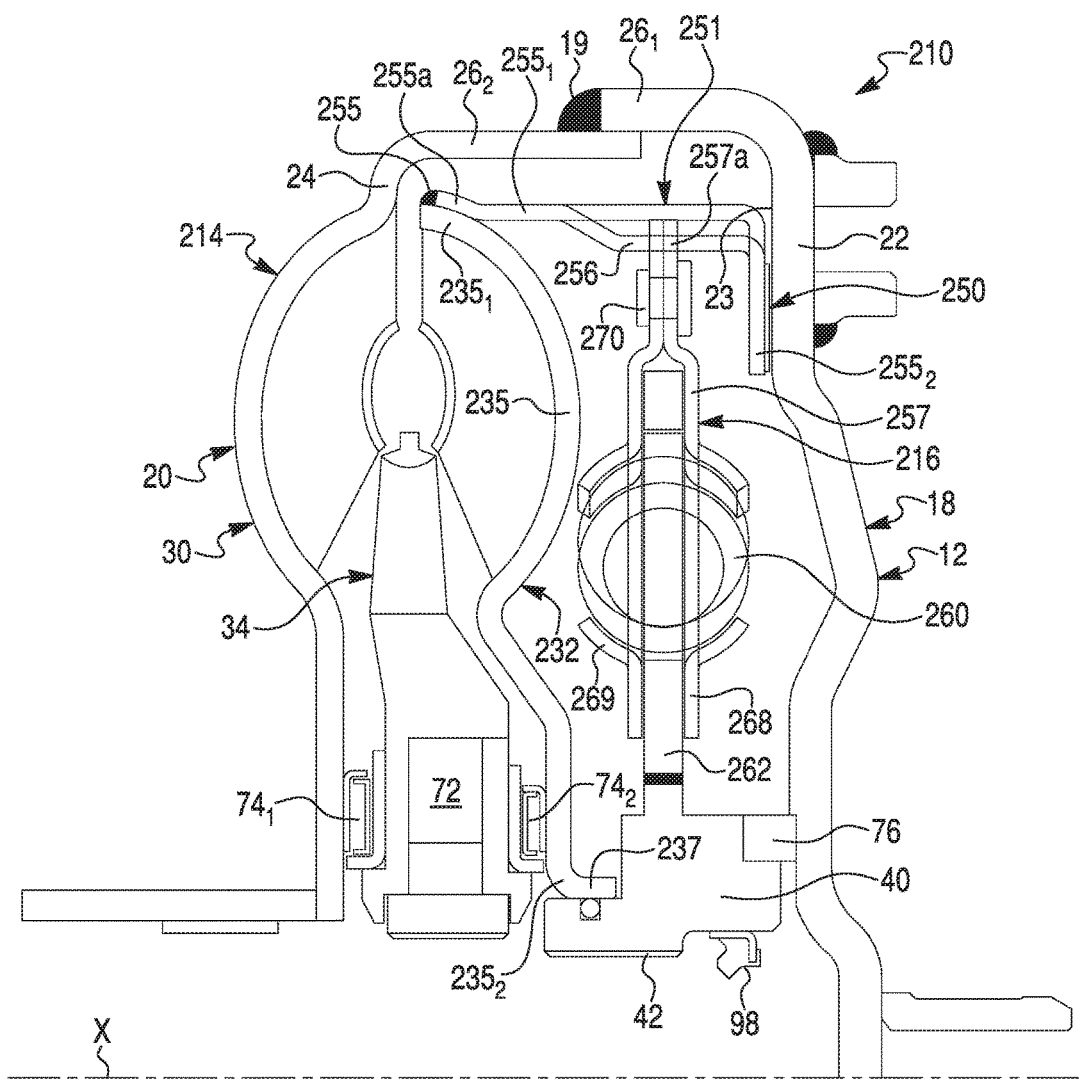
FIG. 4 is a fragmented half-view in axial section of a hydrokinetic torque coupling device equipped with a turbine-piston in accordance with a third exemplary embodiment of the present invention in a lockup mode.

FIG. 4 illustrates a third exemplary embodiment of a hydrokinetic torque coupling device of the present invention, generally depicted by the reference character 210. The hydrokinetic torque coupling device 210 of FIG. 4 corresponds substantially to the hydrokinetic torque coupling device 110 of FIGS. 2, 3A and 3B, and the moveable turbine-piston, a drive-clutch component and a torsional vibration damper, which differ from the second embodiment, will therefore be explained in detail below.

The hydrokinetic torque coupling device 210 of the third exemplary embodiment illustrated in FIG. 4 comprises a sealed casing 12, a torque converter 214, a drive-clutch component 251 and a torsional vibration damper 216. The torque converter 214 includes an impeller 30, a turbine-piston 232, and a stator 34 interposed axially between the impeller 30 and the turbine-piston 232. Each of first and second casing shells 18, 20 may be made, for example, integrally by press-forming one-piece metal sheets. The turbine-piston 232 is a consolidation or incorporation of a turbine with a lockup clutch piston. The turbine-piston 232 differs from the turbine-piston 32 of the second exemplary embodiment illustrated in FIG. 2, by not having a substantially annular, planar turbine-piston flange (such as the turbine-piston flange 38 of the turbine-piston 32) extending radially outwardly from a radially outer peripheral end $235_1$ of the turbine-piston shell 235.

The drive-clutch component 251 is affixed (i.e., non-moveably attached, or fixed) to a turbine-piston shell 235, such as by an annular weld 225 at a radially outer peripheral end $235_1$ of the turbine-piston shell 235 of the turbine-piston 232. The drive-clutch component 251 includes an axially extending tubular drive portion $255_1$ and a substantially radially extending annular clutch portion $255_2$ extending substantially radially downward from the tubular drive portion $255_1$. More specifically, an axially inner distal end $255a$ of the drive portion $255_1$ of the drive-clutch component 251 is fixedly connected to the radially outer peripheral end $235_1$ of the turbine-piston shell 235 of the turbine-piston 232, such as by the butt-weld connection 225. The welding bead is preferably continuous in order to avoid fluid leaks in this area. The axially extending tubular drive portion $255_1$ of the drive-clutch component 251 is provided with inner splines 256 facing a torsional vibration damper 216.

The torsional vibration damper 216 is housed in the casing 12 axially between the turbine-piston 232 and the first casing shell 18, as best shown in FIG. 2. The torsional vibration damper 216 includes an input member 257 operatively connected to the axially extending tubular drive portion $255_1$ of the drive-clutch component 251 so that the drive-clutch component 251 rotationally drives the torsional vibration damper 116. Specifically, the input member 257 of the torsional vibration damper 216 is formed with teeth 257a on an outer peripheral surface thereof, which are complementary to the splines 256 of the drive-clutch component 251. The teeth 257a of the input member 257 non-rotatably and axially slidably engage the complementary splines 256 of the drive-clutch component 251. Accordingly, the input member 257 of the torsional vibration damper 216 is non-rotatable but axially slidable relative to the axially extending tubular drive portion $255_1$ of the drive-clutch component 251 to allow the torsional vibration damper 216 to remain axially fixed relative to the output hub 40 and the casing 12 as the drive-clutch component 251 is displaced axially by the turbine-piston 232 moving in and out of the lockup mode.

The torsional vibration damper 216 further includes a plurality of circumferential elastic damping members 260, and a driven (or output) member 262 drivingly coupled to the input member 257 through the damping members 260. According to the exemplary embodiment of FIG. 3, the damping members 260 are configured as helical (or coil) springs oriented substantially circumferentially. Other elastic members may be used to replace or supplement the damping members 260.

The input member 257 has driving tabs drivingly engaging the damping members 260. The output member 262 of the torsional vibration damper 216 has driven tabs drivingly engaging opposite circumferential ends of the damping members 260 and the driving tabs of the input member 257. The output member 262 of the torsional vibration damper 216 is rotatable relative to the input member 257 due to elasticity of the damping members 260, which absorb torsional vibration.

The drive-clutch component 251 is axially movable relative to the input member 257, thus relative to the torsional vibration damper 216. This relative axial movement may become necessary during axial movement of the turbine-piston shell 235. When the turbine-piston shell 235 shifts axially due to a lockup event, the drive-clutch component 251 moves axially relative to the input member 257 of the torsional vibration damper 216 due to the splined connection between the drive-clutch component 251 and the input member 257 of the torsional vibration damper 216. Thus, the drive-clutch component 251 is axially moveable relative to the torsional vibration damper 216 so as to allow the torsional vibration damper 216 to remain axially fixed relative to the output hub 40 and the casing 12 as the drive-clutch component 251 is displaced axially by the turbine-piston 32 moving in and out of the lockup mode.

The input member 257 of the torsional vibration damper 216 includes first and second disk parts 268, 269 nonmoveably connected to one another, such as by rivets 270. The first and second disk parts 268, 269 establish an input part to the damping members 260. The driven member 262 establishes an output part for the damping members 260. The driven member 262 has windows into which the damping members 264 are set. The disk parts 268, 269 engage first ends of the damping members 260, and the driven member 262 engages second ends of the damping members 260. The disk parts 268, 269 of the input member 257 are thus rotatable relative to the driven member 262, with the damping members 260 absorbing torsional vibration due to their elasticity.

Figure 5:
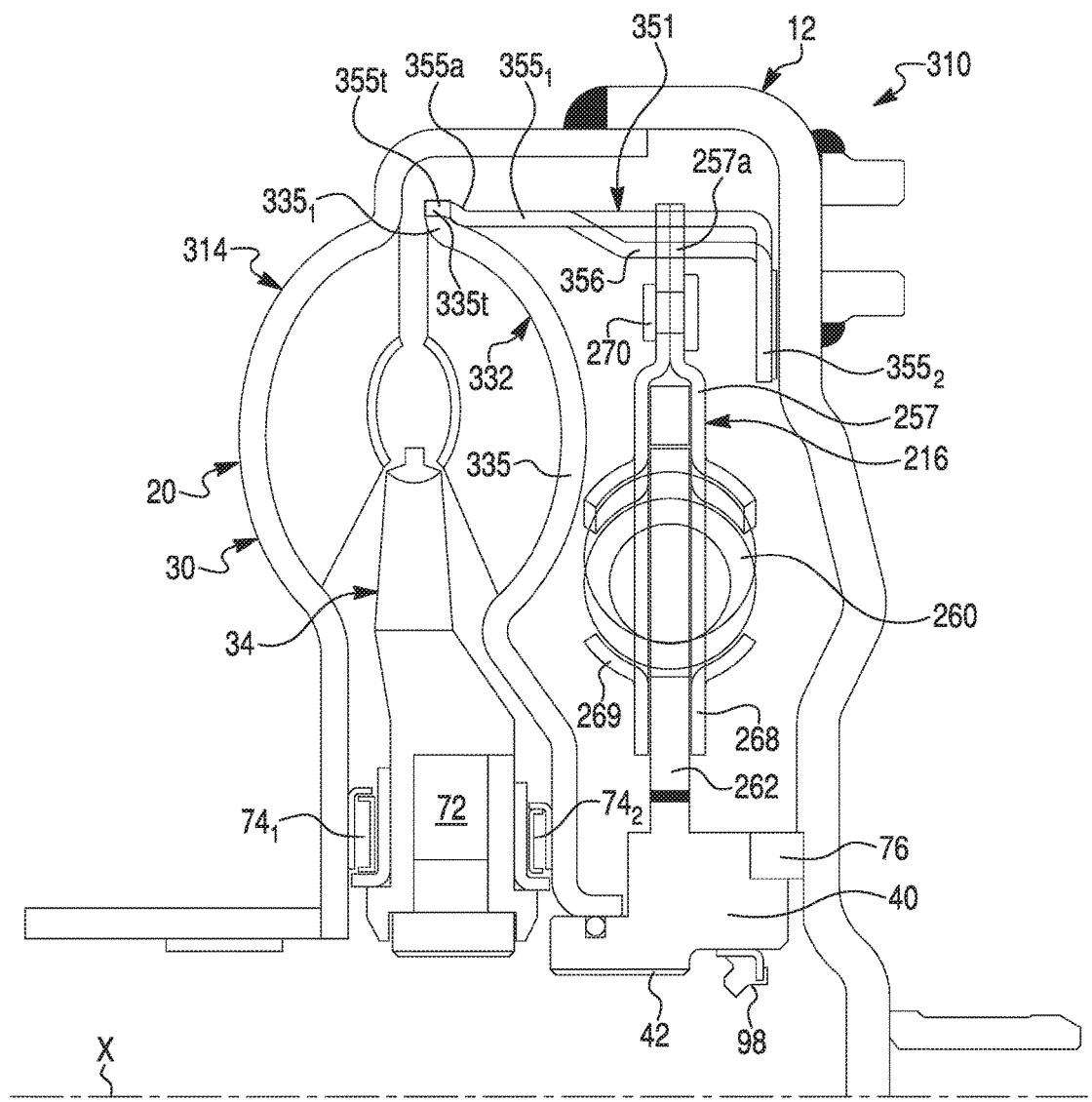
FIG. 5 is a fragmented half-view in axial section of a hydrokinetic torque coupling device equipped with a turbine-piston in accordance with a fourth exemplary embodiment of the present invention.

FIG. 5 illustrates a fourth exemplary embodiment of a hydrokinetic torque coupling device of the present invention, generally depicted by the reference character 310. The hydrokinetic torque coupling device 310 of FIG. 5 corresponds substantially to the hydrokinetic torque coupling device 210 of FIG. 4, and the connection between the moveable turbine-piston and a drive-clutch component, which differ from the third embodiment illustrated in FIG. 4, will therefore be explained in detail below.

The hydrokinetic torque coupling device 310 of the fourth exemplary embodiment illustrated in FIG. 5 comprises a sealed casing 12, a torque converter 314, a drive-clutch component 351 and a torsional vibration damper 216.

The drive-clutch component 351 is affixed (i.e., non-moveably attached, or fixed) to a turbine-piston shell 335 at a radially outer peripheral end $335_1$ of the turbine-piston shell 335 of the turbine-piston 332. The drive-clutch component 351 includes an axially extending tubular drive portion $355_1$ and a substantially radially extending annular clutch portion $355_2$ extending substantially radially downward from the tubular drive portion $355_1$. More specifically, the radially outer peripheral end 335 of the turbine-piston shell 335 is formed with teeth 335t on a radially outer peripheral surface thereof. Similarly, an axially inner distal end 355a of the drive portion $355_1$ of the drive-clutch component 351 is formed with teeth 355t on an axially outer peripheral surface thereof, which are complementary to the teeth 335t of the turbine-piston shell 335. In an assembled condition, the teeth 355t of the drive-clutch component 351 are fixedly connected to the teeth 335t of the turbine-piston shell 335 so that the teeth 355t of the drive-clutch component 351 are press-fitted between the teeth 335t of the turbine-piston shell 335. The axially extending tubular drive portion $355_1$ of the drive-clutch component 351 is provided with inner splines 356 slidably engaging complementary teeth 257a of input member 257 of a torsional vibration damper 216.

Figure 6:
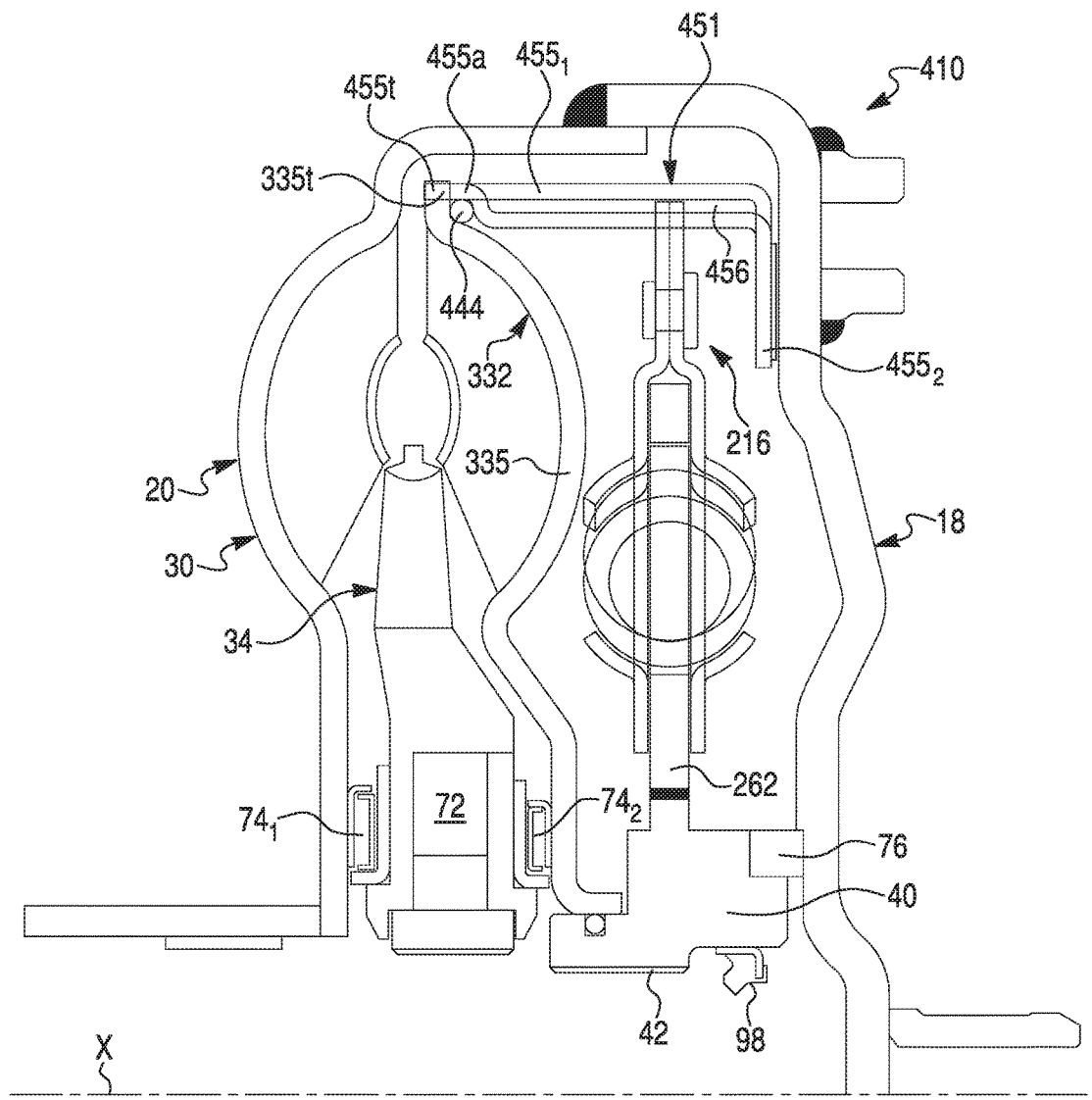
FIG. 6 is a fragmented half-view in axial section of a hydrokinetic torque coupling device equipped with a turbine-piston in accordance with a fifth exemplary embodiment of the present invention.

FIG. 6 illustrates a fifth exemplary embodiment of a hydrokinetic torque coupling device of the present invention, generally depicted by the reference character 410. The hydrokinetic torque coupling device 410 of FIG. 6 corresponds substantially to the hydrokinetic torque coupling device 310 of FIG. 5. Similarly to the torque coupling device 310 of the fourth exemplary embodiment illustrated in FIG. 5, a drive-clutch component 451 is affixed (i.e., non-moveably attached, or fixed) to a turbine-piston shell 335 at a radially outer peripheral end $335_1$ of the turbine-piston shell 335 of the turbine-piston 332. The drive-clutch component 451 includes an axially extending tubular drive portion $455_1$ and a substantially radially extending annular clutch portion $455_2$ extending substantially radially downward from the tubular drive portion $455_1$. More specifically, the radially outer peripheral end $335_1$ of the turbine-piston shell 335 is formed with teeth 335t on a radially outer peripheral surface thereof. Similarly, an axially inner distal end 455a of the drive portion $455_1$ of the drive-clutch component 451 is formed with teeth 455t on an axially outer peripheral surface thereof, which are complementary to the teeth 335t of the turbine-piston shell 335. In an assembled condition, the teeth 455t of the drive-clutch component 451 are fixedly connected to the teeth 335t of the turbine-piston shell 335 so that the teeth 455t of the drive-clutch component 451 are press-fitted between the teeth 335t of the turbine-piston shell 335. The torque coupling device 410 further includes an annular sealing member, such as an O-ring 444, disposed between the radially outer peripheral end 335₁ of the turbine-piston shell 335 and the annular drive portion 455₁ of the drive-clutch component 451 to improve the sealing therebetween. The axially inner distal end 455a of the drive portion 455₁ and the radially outer peripheral end 335₁ of the turbine-piston shell 335 are shaped to accommodate the O-ring 444 therebetween.

Figure 7:
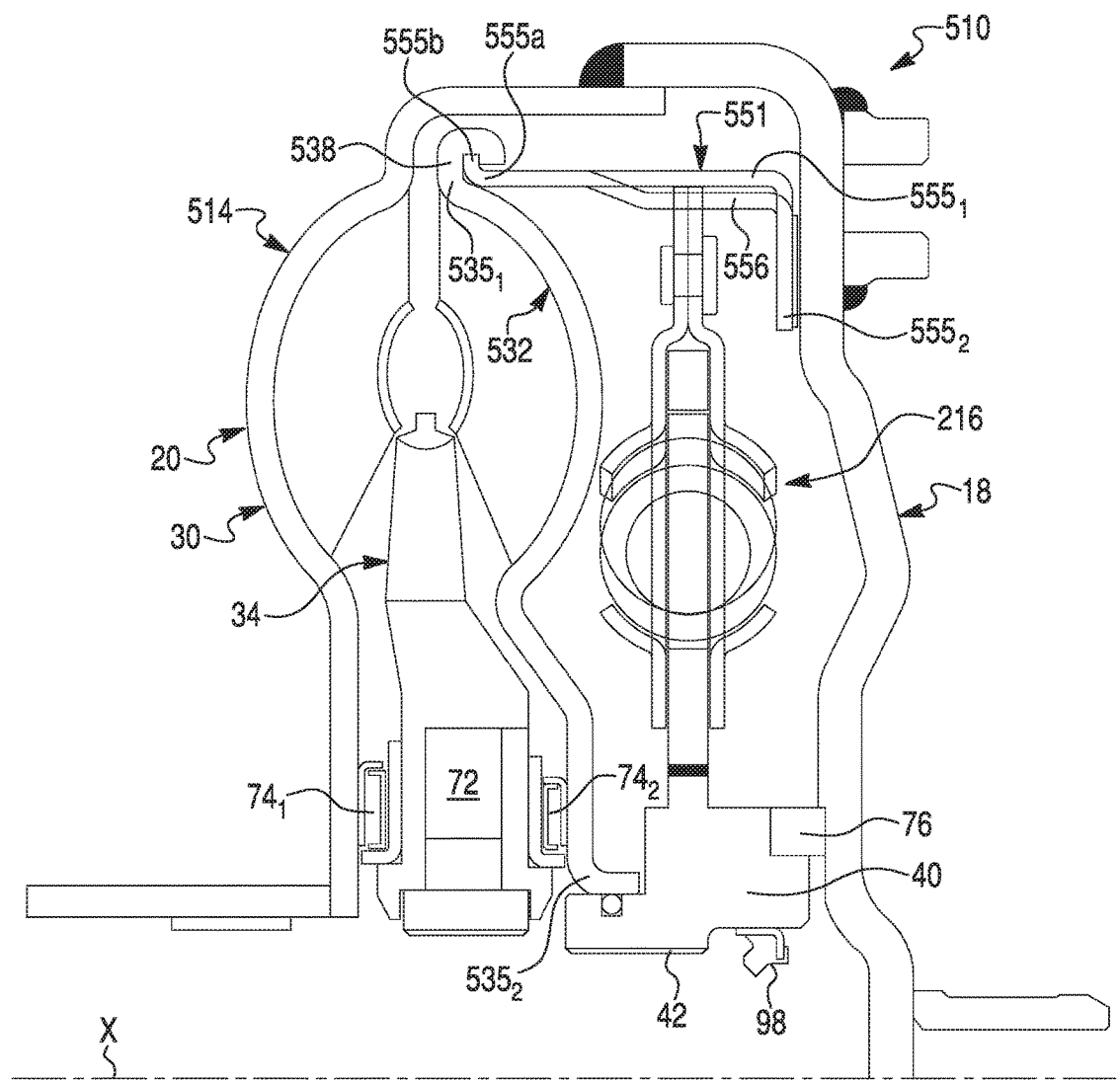
FIG. 7 is a fragmented half-view in axial section of a hydrokinetic torque coupling device equipped with a turbine-piston in accordance with a sixth exemplary embodiment of the present invention.

FIG. 7 illustrates a sixth exemplary embodiment of a hydrokinetic torque coupling device of the present invention, generally depicted by the reference character 510. The hydrokinetic torque coupling device 510 of FIG. 7 corresponds substantially to the hydrokinetic torque coupling device 210 of FIG. 4, and the connection between the moveable turbine-piston and a drive-clutch component, which differ from the fifth embodiment illustrated in FIG. 6, will therefore be explained in detail below.

The hydrokinetic torque coupling device 510 of the sixth exemplary embodiment illustrated in FIG. 7 comprises a sealed casing 12, a torque converter 514, a drive-clutch component 551 and a torsional vibration damper 216. The torque converter 514 includes an impeller 30, a turbine-piston 532, and a stator 34 interposed axially between the impeller 30 and the turbine-piston 532. The turbine-piston 532 is a consolidation or incorporation of a turbine with a lockup clutch piston. The turbine-piston 532 differs from the turbine-piston 32 of the second exemplary embodiment illustrated in FIG. 2 by not having a substantially annular, planar turbine-piston flange (such as the turbine-piston flange 38 of the turbine-piston 32) extending radially outwardly from a radially outer peripheral end 535₁ of the turbine-piston shell 535.

A drive-clutch component 551 is affixed (i.e., non-moveably attached, or fixed) to a turbine-piston shell 535 at a radially outer peripheral end 535₁ of the turbine-piston shell 535 of the turbine-piston 532. The drive-clutch component 551 includes an axially extending tubular drive portion 555₁ and a substantially radially extending annular clutch portion 555₂ extending substantially radially downward from the tubular drive portion 555₁. More specifically, an axially inner distal end 555a of the drive portion 555₁ of the drive-clutch component 551 is formed as a radial flange 555b with teeth. The turbine-piston 532 includes a turbine-piston flange 538 extending radially outwardly from a radially outer peripheral end 535₁ of the turbine-piston shell 535.

During the assembly, after placing the turbine-piston shell 535 inside the tubular drive portion 555₁ of the drive-clutch component 551, the metallic turbine-piston flange 538 of the turbine-piston 532 is bent and rolled over the toothed radial flange 555b of the drive-clutch component 551 in order to non-moveably (i.e., fixedly) attach the drive-clutch component 551 to the turbine-piston 532.

Figure 8:
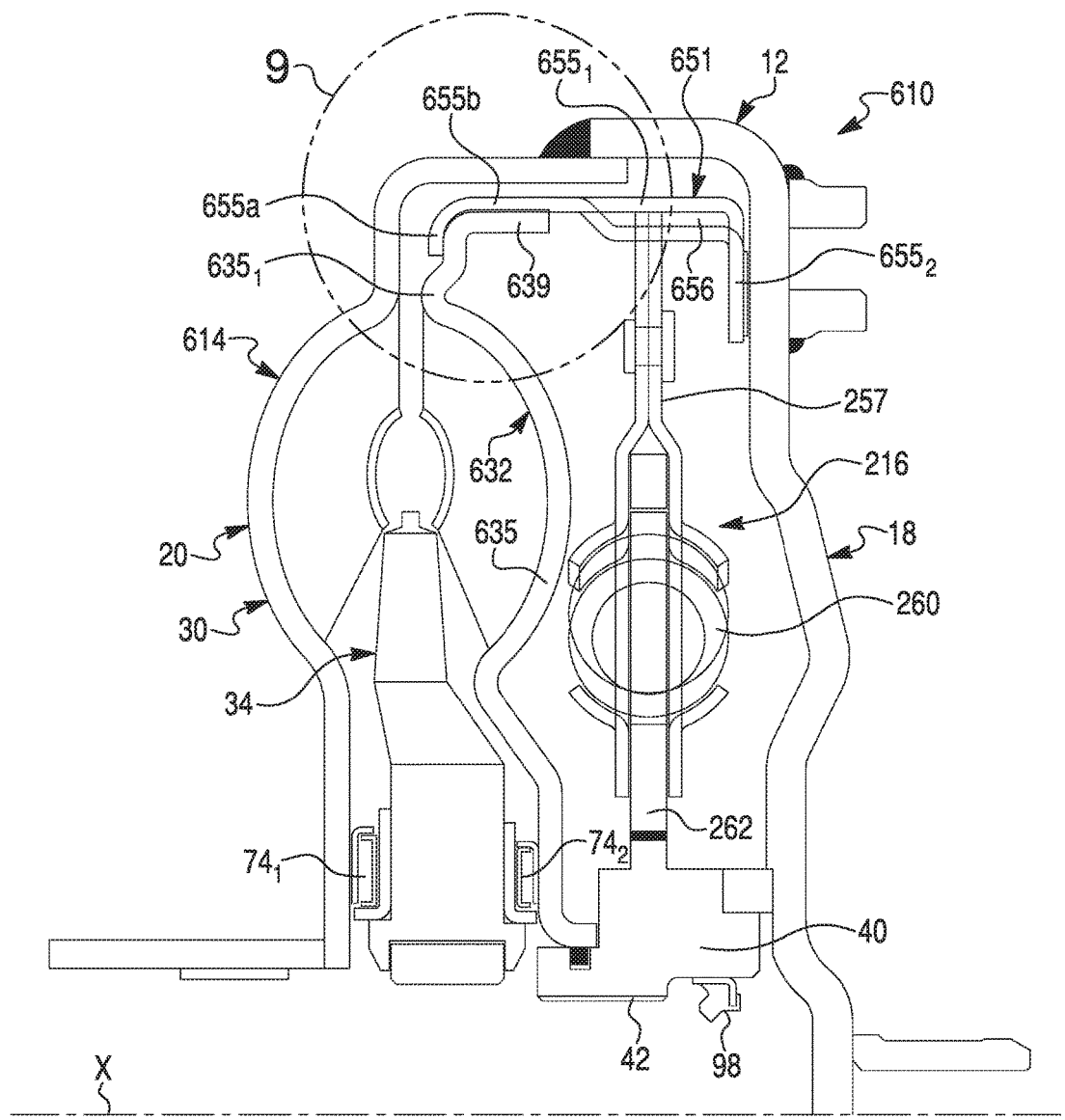
FIG. 8 is a fragmented half-view in axial section of a hydrokinetic torque coupling device equipped with a turbine-piston in accordance with a seventh exemplary embodiment of the present invention in an assembled condition.

FIG. 8 illustrates a seventh exemplary embodiment of a hydrokinetic torque coupling device of the present invention, generally depicted by the reference character 610. The hydrokinetic torque coupling device 610 of FIG. 8 corresponds substantially to the hydrokinetic torque coupling device 510 of FIG. 7, and the connection between the moveable turbine-piston and a drive-clutch component, which differ from the sixth embodiment of FIG. 7, will therefore be explained in detail below.

The hydrokinetic torque coupling device 610 of the seventh exemplary embodiment illustrated in FIG. 8 comprises a sealed casing 12, a torque converter 614, a drive-clutch component 651 and a torsional vibration damper 216. The torque converter 614 includes an impeller 30, a turbine-piston 632, and a stator 34 interposed axially between the impeller 30 and the turbine-piston 632. The turbine-piston 632 is a consolidation or incorporation of a turbine with a lockup clutch piston.

Figure 9:
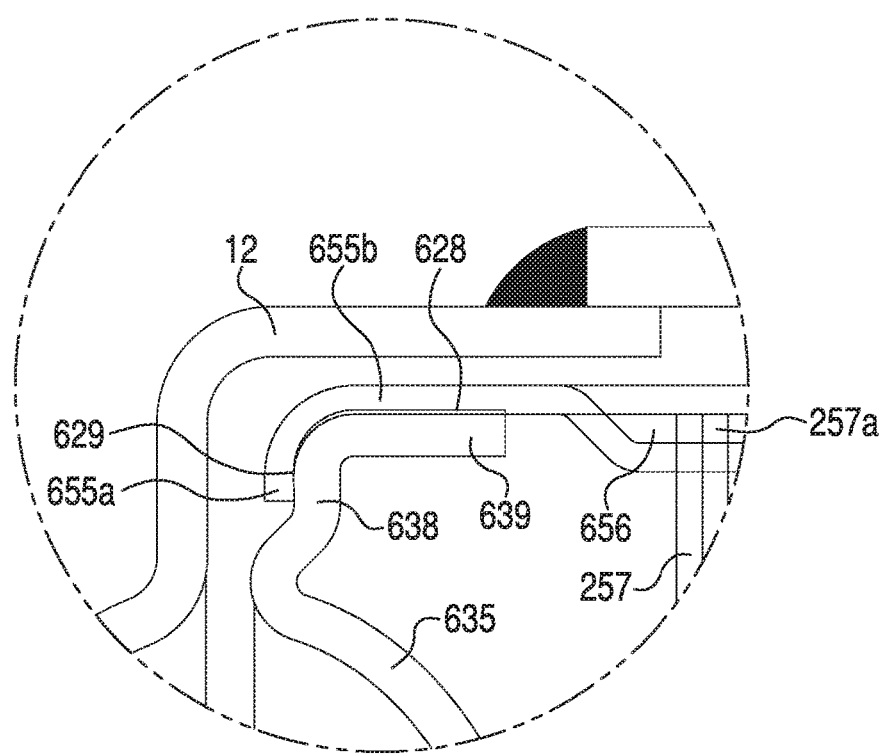
FIG. 9 is an enlarged view of a fragment of the torque coupling device shown in the circle IX in FIG. 8.
Figure 10:
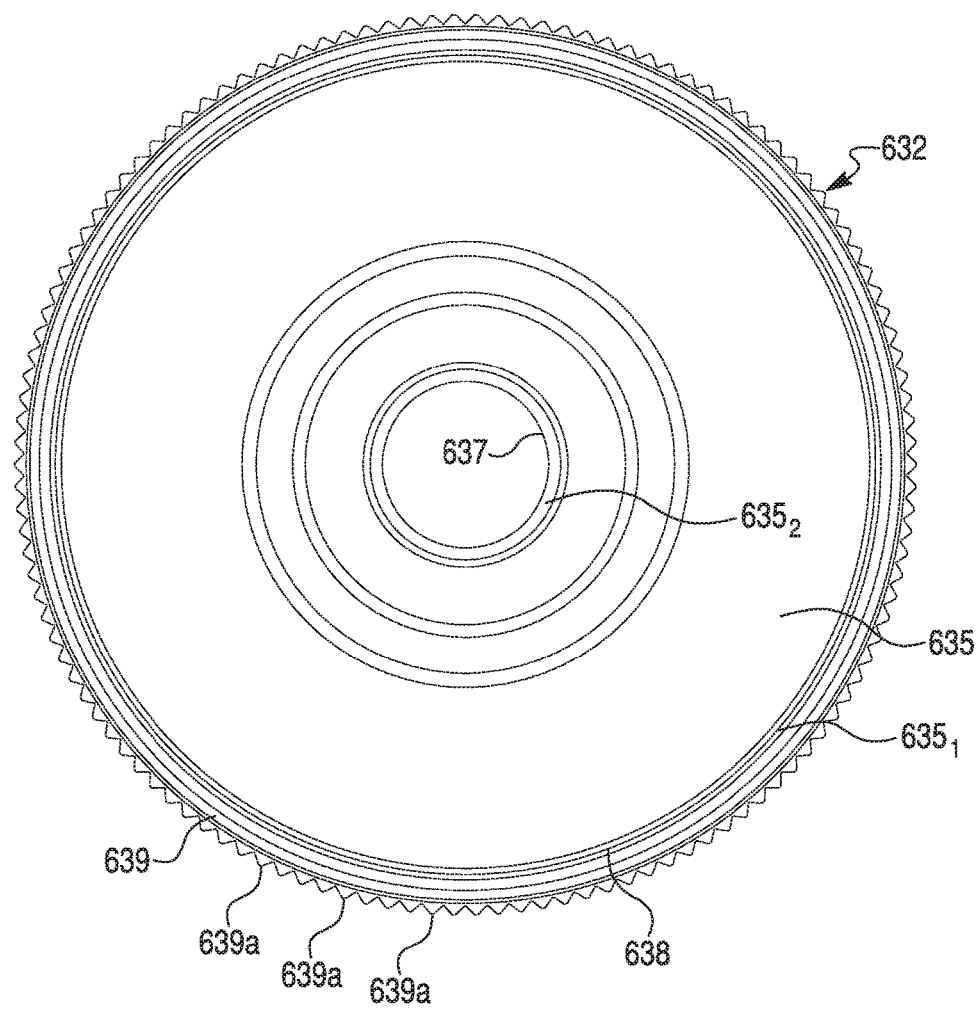
FIG. 10 is a front view of a turbine-piston shell of the torque coupling device of FIG. 8.

As best shown in FIGS. 8-9, the turbine-piston 632 includes a support flange 638 extending substantially radially outwardly from a radially outer peripheral end 635₁ of the turbine-piston shell 635, and an annular mounting flange 639 extending axially outwardly from a radially outer end of the support flange 638. A drive-clutch component 651 includes an axially extending tubular drive portion 655₁ and an annular clutch portion 655₂ extending substantially radially downward from the tubular drive portion 655₁. More specifically, an axially inner distal end 655a of the drive portion 655₁ of the drive-clutch component 651 is in the form of a flange extending radially outwardly from the drive portion 655₁.

The drive-clutch component 651 is affixed (i.e., non-moveably attached, or fixed) to the turbine-piston shell 635 by a press-fit connection 628 and by bending an axially inner distal end 655a of the drive portion 655₁ of the drive-clutch component 651 onto the profile of the turbine-piston 632. The drive-clutch component 651 includes an axially extending tubular drive portion 655₁ and a substantially radially extending annular clutch portion 655₂ extending substantially radially downward from the tubular drive portion 655₁.

Figure 11:
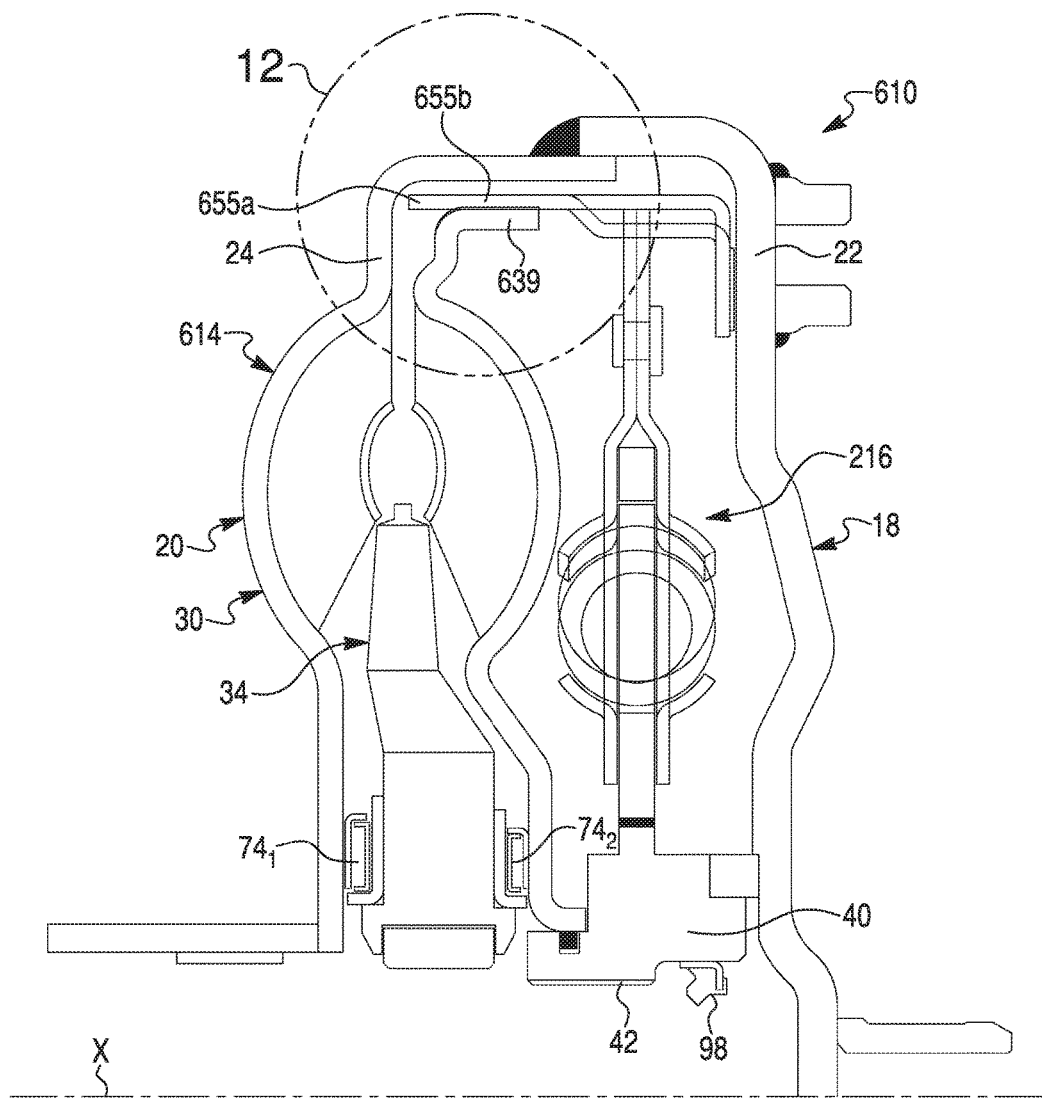
FIG. 11 is a fragmented half-view in axial section of the hydrokinetic torque coupling device of FIG. 8 in a partially assembled condition.
Figure 12:
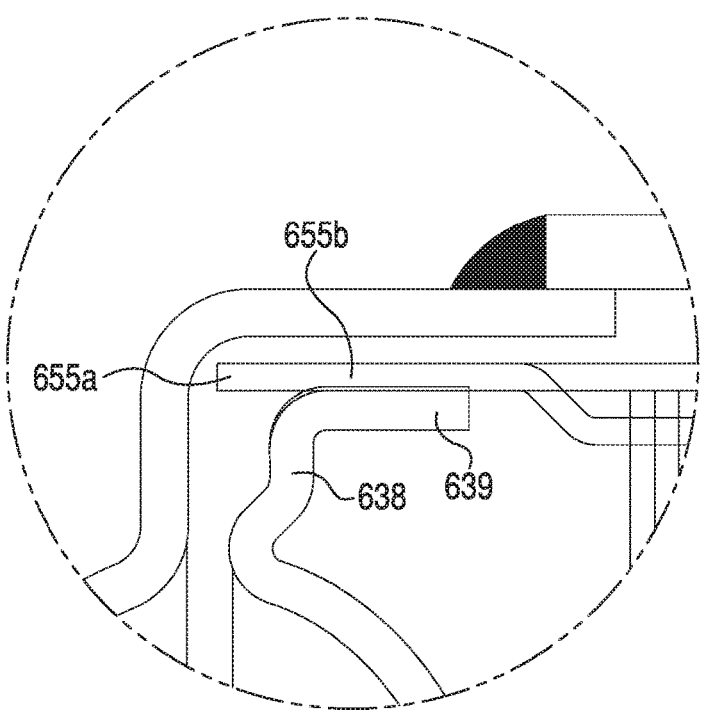
FIG. 12 is an enlarged view of a fragment of the torque coupling device shown in the circle XII in FIG. 11.

In a non-assembled condition, the axially inner distal end 655a of the drive portion 655₁ of the drive-clutch component 651 is in the form of a flange extending radially outwardly from the clutch portion 655₂, as best shown in FIGS. 11 and 12. An outer peripheral surface of the annular mounting flange 639 of the turbine-piston 632 has small teeth (or serrations) 639a formed into it. An outer diameter of the serrations 639a (i.e., a maximum diameter of the annular mounting flange 639) is slightly larger than an inner diameter of a mating portion 655b of the tubular drive portion 655₁ of the drive-clutch component 651.

According to an exemplary method, the mating portion 655b of the tubular drive portion 655₁ of the drive-clutch component 651 is axially mounted over the annular mounting flange 639 of the turbine-piston 632 by applying large amount of force so as to form a press-fit (also known as an interference fit or friction fit) between the mating portion 655b of the drive-clutch component 651 and the annular mounting flange 639 of the turbine-piston 632. The interference fit is substantially enhanced by the serrations 639a.

As best shown in FIGS. 11 and 12, after the press-fit process, the axially inner distal end 655a of the drive portion 655₁ of the drive-clutch component 651 overhangs the annular mounting flange 639 of the turbine-piston 632.

Next, the axially inner distal end 655a of the drive portion 655₁ overhanging the annular mounting flange 639 of the turbine-piston 632 is bent (deformed) by a rolling process to follow the overhanging axially inner distal end 655a onto the profile of the support flange 638 of the turbine-piston 632. As a result, the drive-clutch component 651 is affixed to the turbine-piston shell 635.

The axially extending tubular drive portion 655₁ of the drive-clutch component 651 is provided with inner splines 656 slidably engaging complementary teeth 257a of an input member 257 of a torsional vibration damper 216.

FIGS. 13-21 illustrate an eighth exemplary embodiment of a hydrokinetic torque coupling device of the present invention, generally depicted by the reference character 710.

The hydrokinetic torque coupling device 710 of FIG. 13 corresponds substantially to the hydrokinetic torque coupling device 10 of FIG. 1, and the torsional vibration damper and connection between a moveable turbine-piston and a drive-clutch component, which differ from the seventh embodiment of FIG. 8-12, will therefore be explained in detail below.

Figure 13:
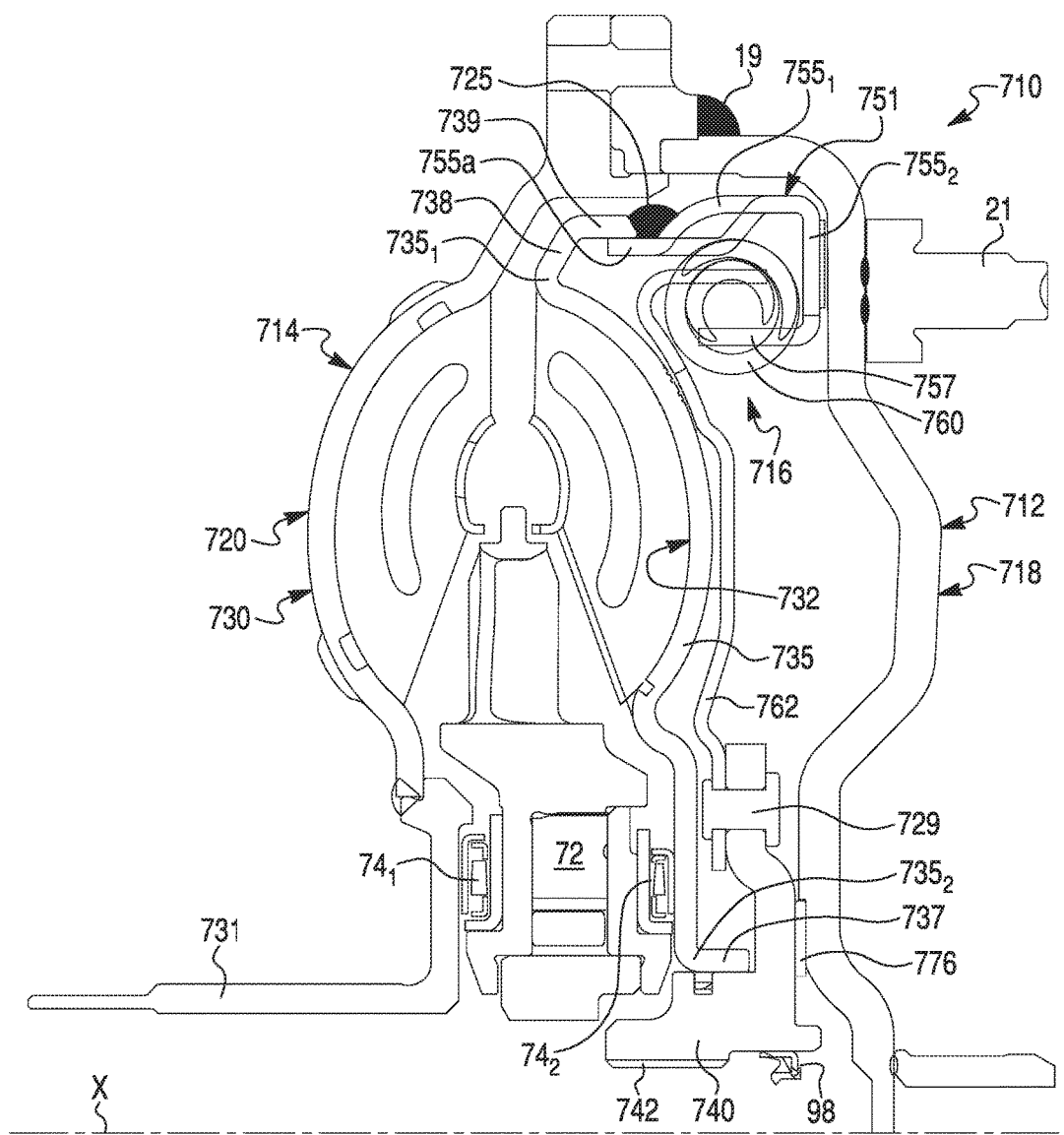
FIG. 13 is a fragmented half-view in axial section of a hydrokinetic torque coupling device equipped with a turbine-piston in accordance with an eighth exemplary embodiment of the present invention.

The hydrokinetic torque coupling device 710 of the eighth exemplary embodiment illustrated in FIG. 13 comprises a sealed casing 712, a torque converter 714, a drive-clutch component 751 and a torsional vibration damper 716. The torque converter 714 includes an impeller 730, a turbine-piston 732, and a stator 734 interposed axially between the impeller 730 and the turbine-piston 732. The turbine-piston 732 is a consolidation or incorporation of a turbine with a lockup clutch piston.

Figure 16:
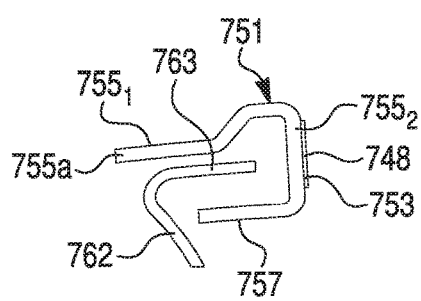
FIG. 16 is a cross-sectional view of the drive-clutch component and the torsional vibration damper taken along the line 16-16 in FIG. 15.
Figure 21:
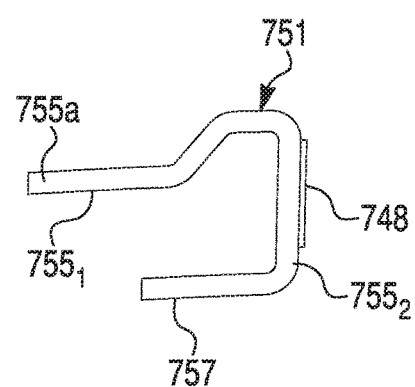
FIG. 21 is a cross-sectional view of the drive-clutch component taken along the line 21-21 in FIG. 20.

The turbine-piston 732 includes a support flange 738 extending substantially outwardly away from a radially outer peripheral end 735, of the turbine-piston shell 735, and an annular mounting flange 739 extending axially outwardly from a radially outer end of the support flange 738. A drive-clutch component 751 includes a generally axially extending annular drive portion $755_1$ and an annular clutch portion $755_2$ extending substantially radially downward from the drive portion $755_1$. More specifically, an axially inner distal end 755a of the drive portion $755_1$ of the drive-clutch component 751 is in the form of a flange extending radially outwardly from the drive portion $755_1$, as best shown in FIGS. 13, 16 and 21. The drive-clutch component 751 is affixed (i.e., non-moveably attached, or fixed) to the turbine-piston shell 735, such as by an annular weld 725 and/or fasteners near a radially distal end of the mounting flange 739 of the turbine-piston 732.

Figure 14:
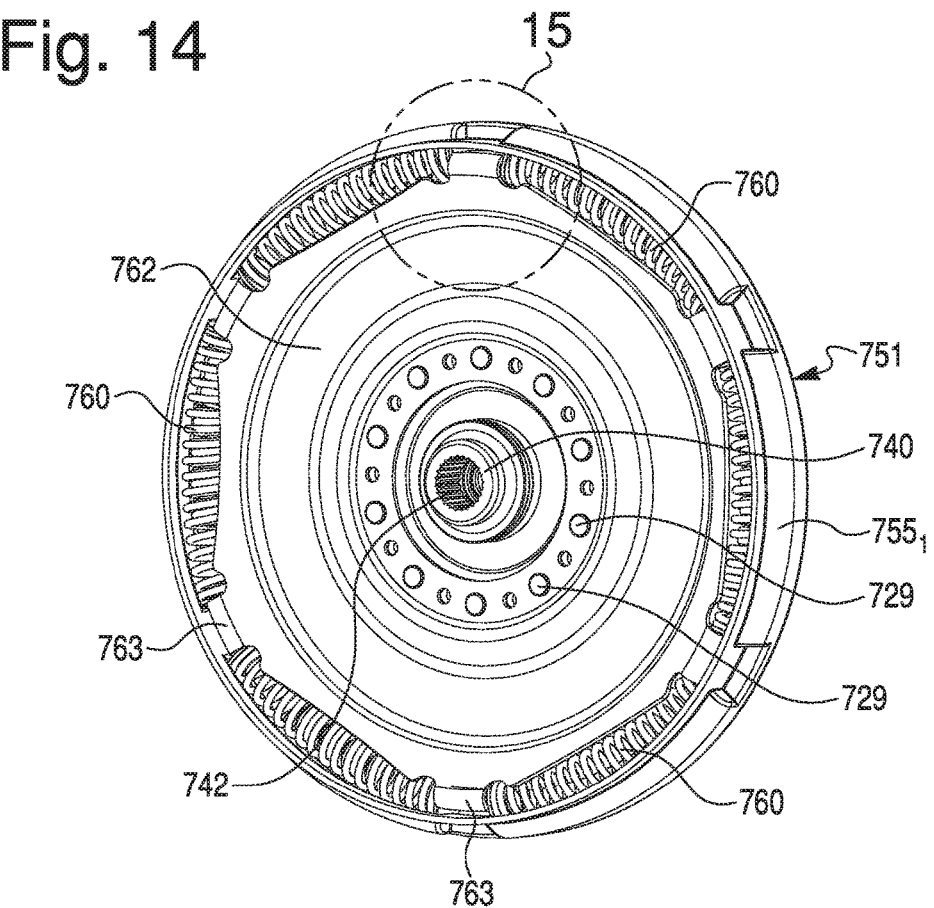
FIG. 14 is a front perspective view of a drive-clutch component and a torsional vibration damper of the torque coupling device of FIG. 13.
Figure 15:
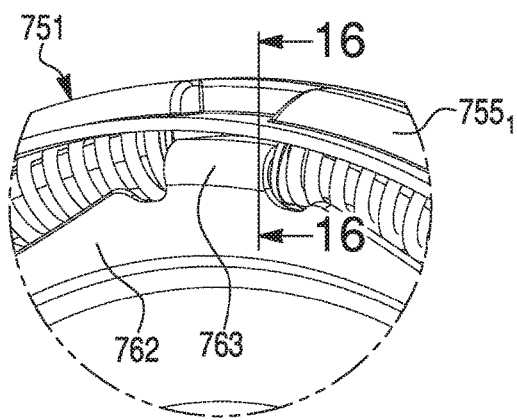
FIG. 15 is an enlarged view of a fragment of the torsional vibration damper shown in the circle XV in FIG. 14.
Figure 17:
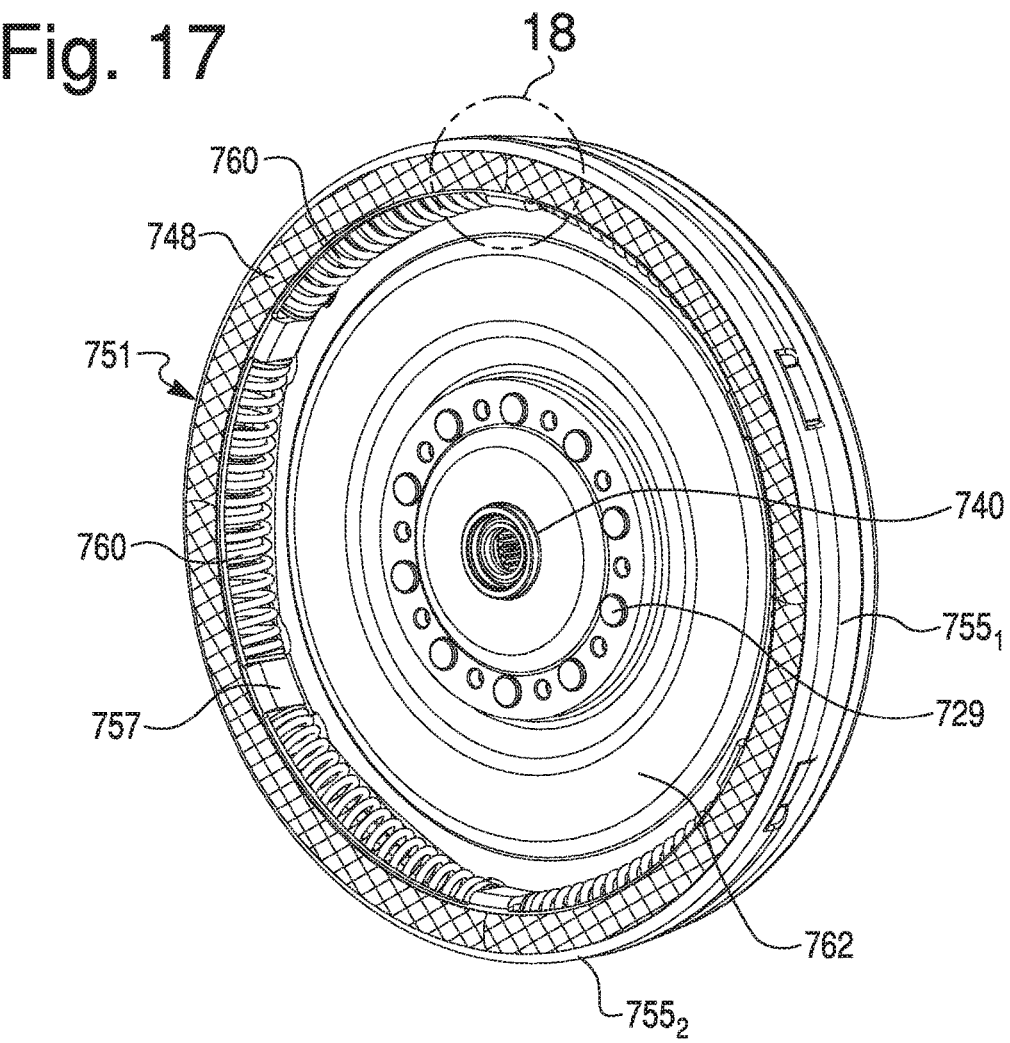
FIG. 17 is a rear perspective view of the drive-clutch component and the torsional vibration damper of the torque coupling device of FIG. 13.
Figure 18:
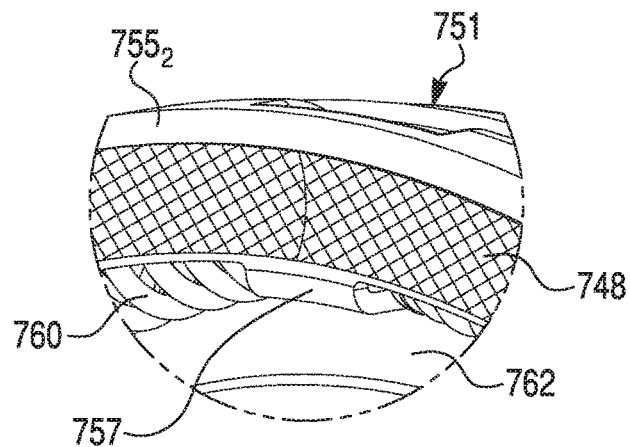
FIG. 18 is an enlarged view of a fragment of the drive-clutch component and the torsional vibration damper shown in the circle XVIII in FIG. 17.

The drive-clutch component 751 axially overlaps and engages the torsional vibration damper 716, irrespective of whether the drive-clutch component 751 is in or out of lockup mode, as shown in FIGS. 13, 14 and 17. In both modes, the drive-clutch component 751 is configured to rotationally drive the torsional vibration damper 716 and an output hub 740.

Figure 19:
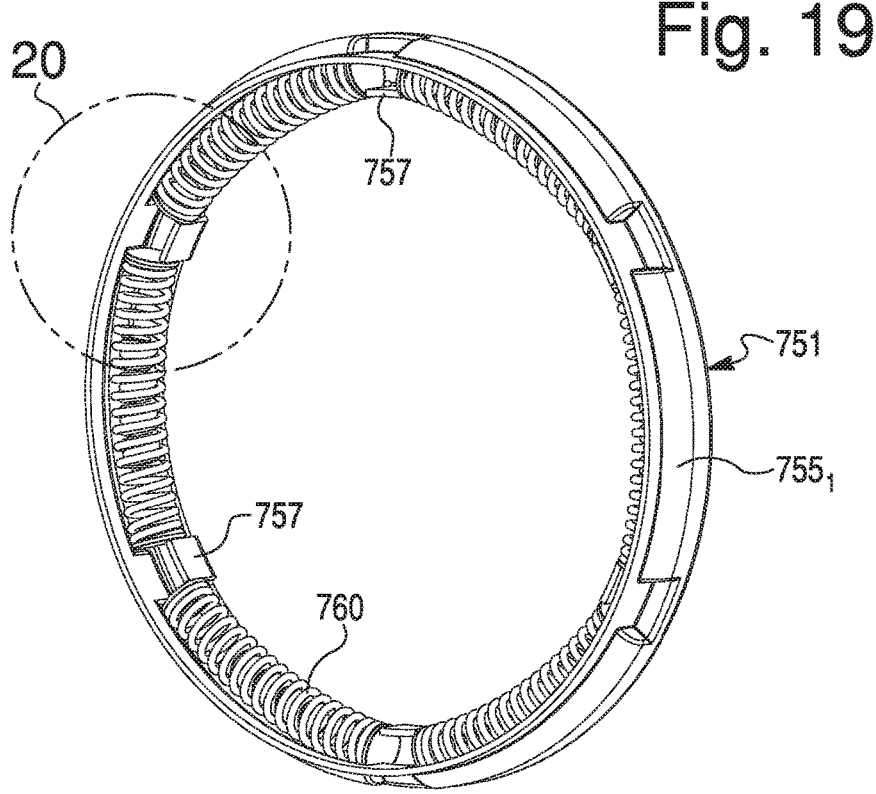
FIG. 19 is a perspective view of the drive-clutch component with elastic members of the torsional vibration damper of the torque coupling device of FIG. 13.
Figure 20:
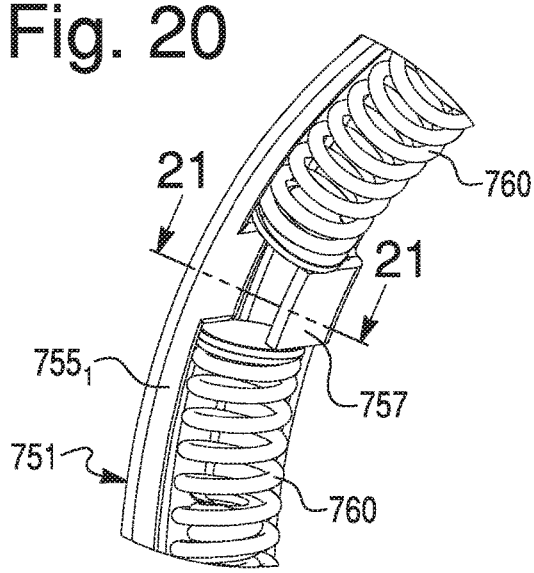
FIG. 20 is an enlarged view of a fragment of the drive-clutch component with elastic members of the torsional vibration damper shown in the circle XX in FIG. 19.

The torsional vibration damper 716 is housed in a casing 712 axially between the turbine-piston 732 and a first casing shell 718, as best shown in FIG. 13. The drive-clutch component 751 serves as an input for the torsional vibration damper 716. For this reason, the drive-clutch component 751 includes drive tabs 757, best shown in FIGS. 17-21. The torsional vibration damper 716 further includes a plurality of circumferential elastic damping members 760 (best shown in FIGS. 14, 17 and 19), and a driven (or output) member 762 drivingly coupled to the drive-clutch component 751 through the circumferential damping members 760. The drive tabs 757 of the drive-clutch component 751 are configured to cooperate with the circumferential elastic damping members 760. As best shown in FIGS. 14, 17 and 19, the damping members 760 are configured as helical (or coil) springs oriented substantially circumferentially. Other elastic members may be used to replace or supplement the damping members 760.

The driving tabs 757 of the drive-clutch component 751 extend axially and/or radially toward the circumferential elastic damping members 760 of the torsional vibration damper 716 and drivingly engage the circumferential damping members 760. The driving tabs 757 are circumferentially equidistantly spaced from one another to engage circumferential ends of the damping members 760. Therefore, the drive-clutch component 751 is a consolidation or incorporation of a clutch component with an input part of the torsional vibration damper 716. The output member 762 of the torsional vibration damper 716 has a plurality of driven tabs 763 extending toward and drivingly engaging the circumferential damping members 760, best shown in FIGS. 14-16. The driven tabs 763 of the output member 762 are circumferentially equidistantly spaced from one another, and engage the opposite circumferential ends of the damping members 760. In other words, the damping members 760 are disposed between, on the one hand, the driven tabs 763 of the output member 762 and, on the other hand, the driving tabs 757 formed in the drive-clutch component 751. The output member 762 of the torsional vibration damper 716 is rotatable relative to the drive-clutch component 751 due to elasticity of the damping members 760, which absorb torsional vibration.

As best shown in FIGS. 13, 14 and 17, the output hub 740 and driven member 762 are preferably integral with one another. The non-rotatable connection between the driven member 762 and the output hub 740 may be formed by rivets 729 (best shown in FIG. 13), splines or welding. A thrust bearing 776 is positioned between the output hub 740 and the first casing shell 718.

Figure 22:
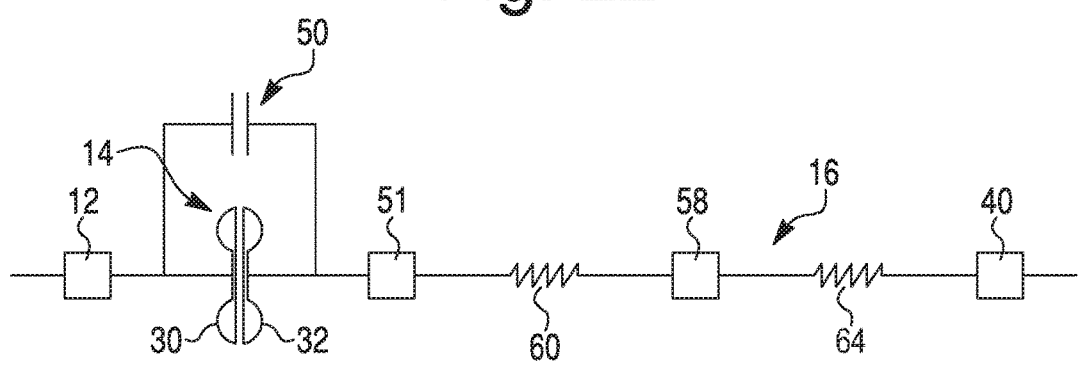
FIG. 22 is a simplified diagram of a hydrodynamic torque coupling device including a turbine-piston with a dual or double damper assembly.

The torque converters and hydrodynamic torque coupling devices described herein may incorporate different damper assemblies. For example, FIG. 22 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 7. The diagram of FIG. 22 generally corresponds to the arrangement of the embodiments shown in FIGS. 1 and 2.

Figure 23:
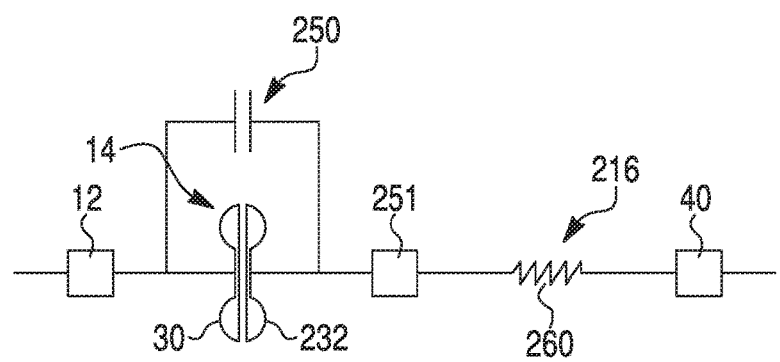
FIG. 23 is a simplified diagram of another hydrodynamic torque coupling device including a turbine-piston with a single damper assembly.

FIG. 23 shows an alternative damper assembly 216 similar to that of FIG. 22, but in which the damper assembly 16 is modified to include only one set of circumferentially extending elastic damping members 260. The diagram of FIG. 23 generally corresponds to the arrangement of the embodiments shown in FIGS. 4-8 and 13.

Figure 24:
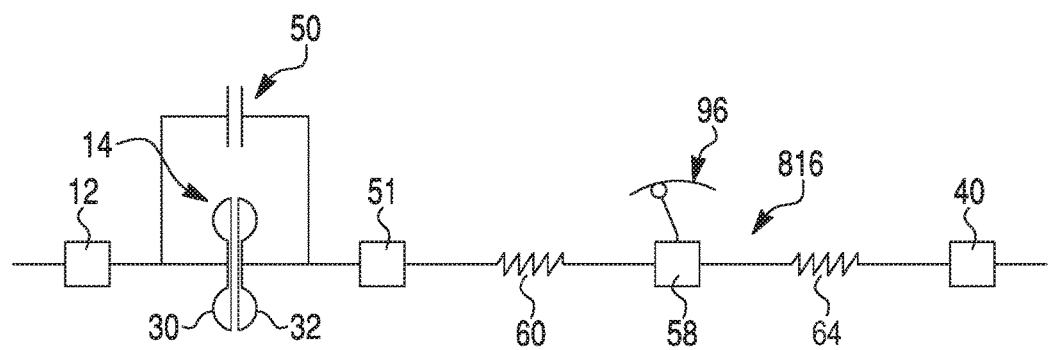
FIG. 24 is a simplified diagram of still another hydrodynamic torque coupling device including a turbine-piston with dual or double damper assemblies and a pendulum vibration absorber.

A damper assembly 816 shown in FIG. 24 is similar to that of FIG. 22, but further includes a centrifugal pendulum oscillator 96 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 58 and may be arranged on both sides of the intermediate member 58.

Figure 25:
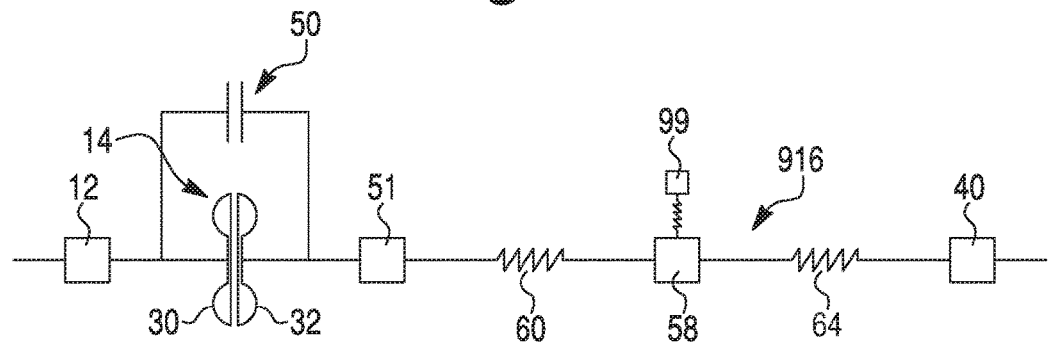
FIG. 25 is a simplified diagram of a further hydrodynamic torque coupling device including a turbine-piston with dual or double damper assemblies and a vibration absorbing spring-mass system.

A damper assembly 916 shown in FIG. 25 is similar to that of FIG. 22, but further includes a spring mass system 99 coupled to the intermediate member 58. Spring-mass systems are well known in the art and described in, for example, WO 2004/018897 to Haller. The spring-mass system 99 may be coupled to the circumference of the intermediate member 58. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling a driving shaft and a driven shaft together, comprising:
   an impeller comprising an impeller shell and a plurality of impeller blades;
   a casing comprising the impeller shell and a cover shell connected to the impeller shell, the casing having a first engagement surface, wherein the first engagement surface comprises an inner surface of the cover shell;
   an axially displaceable turbine-piston coaxially aligned with and hydrodynamically drivable by the impeller, the turbine-piston comprising a turbine-piston shell and a plurality of turbine blades attached to the turbine-piston shell;
   a drive-clutch component affixed to the turbine-piston shell and comprising a drive portion and a clutch portion, the clutch portion having a second engagement surface movable axially toward and away from the first engagement surface, the drive portion being configured to engage and rotationally drive a torsional vibration damper,
   the turbine-piston is axially displaceable relative to the casing to move the second engagement surface axially towards and away from the first engagement surface for positioning the hydrokinetic torque coupling device respectively into and out of a lockup mode in which the turbine-piston is mechanically locked to and non-rotatable relative to the casing.

2. The hydrokinetic torque coupling device of claim 1, further comprising an output hub and the torsional vibration damper; wherein the torsional vibration damper interconnects the drive-clutch component and the output hub; and wherein the drive-clutch component is axially movable relative to the torsional vibration damper.

3. The hydrokinetic torque coupling device of claim 2, wherein the torsional vibration damper comprises an intermediate member, a first set of circumferentially extending elastic damping members drivingly coupling the drive-clutch component to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

4. The hydrokinetic torque coupling device of claim 2, wherein the torsional vibration damper comprises an intermediate member, a first set of circumferentially extending elastic damping members drivingly coupling the drive-clutch component to the intermediate member, a driven member connected to and non-rotatable relative to the output hub, a second set of circumferentially extending elastic damping members drivingly coupling the intermediate member to the driven member, and a spring mass system coupled to the intermediate member.

5. The hydrokinetic torque coupling device of claim 2, wherein the torsional vibration damper comprises: a driven member non-rotatably connected to the output hub; and circumferential elastic damping members rotatably interconnecting the drive-clutch component to the driven member.

6. The hydrokinetic torque coupling device of claim 5, wherein the torsional vibration damper further comprises an input member non-rotatably connected to the drive portion of the drive-clutch component and operatively connected to the driven member through the circumferential elastic damping members so as to rotatably interconnect the drive-clutch component to the driven member.

7. The hydrokinetic torque coupling device of claim 6, wherein the drive-clutch component is axially moveable relative to the input member of the torsional vibration damper.

8. The hydrokinetic torque coupling device of claim 7, wherein the drive portion of the drive-clutch component is provided with axially extending inner splines facing the torsional vibration damper, wherein the input member of the torsional vibration damper is formed with teeth on an outer peripheral surface thereof, and wherein the teeth are complementary to the splines of the drive-clutch component and configured to non-rotatably and axially slidably engage the splines of the drive-clutch component.

9. The hydrokinetic torque coupling device of claim 5, wherein the drive-clutch component further comprises a plurality of driving tabs drivingly engaging the damping members; and wherein the driven member of the torsional vibration damper has a plurality of driven tabs drivingly engaging the damping members so that the damping members are disposed between the driven tabs of the driven member and the driving tabs of the drive-clutch component.

10. The hydrokinetic torque coupling device of claim 1, wherein the drive portion of the drive-clutch component is affixed to the turbine-piston shell.

11. A method of assembling a hydrokinetic torque coupling device for coupling a driving shaft and a driven shaft together, comprising the steps of:
    providing a torque converter comprising an impeller including an impeller shell and impeller blades, and an axially displaceable turbine-piston including a turbine-piston shell and a plurality of turbine blades attached to the turbine-piston shell;
    providing a drive-clutch component comprising a drive portion and a clutch portion;
    non-moveably attaching the drive portion of the drive-clutch component to the turbine-piston shell;
    mounting a torsional vibration damper so that the drive-clutch component drivingly engages the torsional vibration damper; and
    non-moveably attaching a cover shell having a first engagement surface to the impeller shell so as to form a casing enclosing the torque converter, the drive-clutch component, and the torsional vibration damper and so that the first engagement surface faces a second engagement surface of the clutch portion of the drive-clutch component, the second engagement surface being moveable axially towards and away from the first engagement surface for positioning the hydrokinetic torque coupling device respectively into and out of a lockup mode in which the turbine-piston is mechanically locked to and non-rotatable relative to the casing.

12. The method of claim 11, wherein the step of non-moveably attaching the drive portion of the drive-clutch component to the turbine-piston shell comprises securing the drive portion to the turbine-piston shell via an interference fit.

13. The method of claim 12, wherein the torsional vibration damper comprises a driven member and circumferential elastic damping members; and wherein the method further comprising the steps of: non-rotatably connecting the driven member to the output hub; and rotatably interconnecting the drive-clutch component to the driven member with the elastic damping members.

14. The method of claim 13, wherein the torsional vibration damper further comprises an input member non-rotatably connected to the drive portion of the drive-clutch component and operatively connected to the driven member through the circumferential elastic damping members so as to rotatably interconnect the drive-clutch component to the driven member.

15. The method of claim 14, wherein the drive portion of the drive-clutch component is provided with axially extending inner splines facing the torsional vibration damper, wherein the input member of the torsional vibration damper is formed with teeth on an outer peripheral surface thereof, wherein the teeth are complementary to the splines of the drive-clutch component; and wherein the torsional vibration damper is mounted to the drive-clutch component so that the teeth of the input member of the torsional vibration damper non-rotatably and axially slidably engage the splines of the drive-clutch component.

16. The method of claim 11, wherein the step of non-moveably attaching the drive portion of the drive-clutch component to the turbine-piston shell comprises by bending a part of the drive portion of the drive-clutch component to engage the turbine-piston shell.

17. The method of claim 11, further comprising: interconnecting the drive-clutch component and an output hub via the torsional vibration damper, wherein the drive-clutch component is axially movable relative to the torsional vibration damper.

18. A method of assembling a hydrokinetic torque coupling device for coupling a driving shaft and a driven shaft together, comprising the steps of:

providing a torque converter comprising an impeller including an impeller shell and impeller blades, and an axially displaceable turbine-piston including a turbine-piston shell and a plurality of turbine blades attached to the turbine-piston shell;
providing a drive-clutch component comprising a drive portion and a clutch portion;
non-moveably attaching the drive portion of the drive-clutch component to the turbine-piston shell by welding the drive portion of the drive-clutch component to the turbine-piston shell;
mounting a torsional vibration damper so that the drive-clutch component drivingly engages the torsional vibration damper; and
non-moveably attaching a cover shell having a first engagement surface to the impeller shell so as to form a casing enclosing the torque converter, the drive-clutch component, and the torsional vibration damper and so that the first engagement surface faces a second engagement surface of the clutch portion of the drive-clutch component, the second engagement surface being moveable axially towards and away from the first engagement surface for positioning the hydrokinetic torque coupling device respectively into and out of a lockup mode in which the turbine-piston is mechanically locked to and non-rotatable relative to the casing.

19. A method of assembling a hydrokinetic torque coupling device for coupling a driving shaft and a driven shaft together, comprising:

providing a torque converter comprising an impeller including an impeller shell and a plurality of impeller blades, an axially displaceable turbine-piston including a turbine-piston shell and a plurality of turbine blades attached to the turbine-piston shell, and a drive-clutch component non-moveably attached to the turbine-piston shell and having a second engagement surface; and
operatively connecting the torque converter to a cover shell having a first engagement surface and a damper assembly including an input part and an output part operatively connectable to an output hub, wherein the turbine-piston is axially displaceable relative to the cover shell to move the second engagement surface axially towards and away from the first engagement surface for positioning the hydrokinetic torque coupling device respectively into and out of a lockup mode in which the first and second engagement surfaces frictionally interlock with one another to mechanically lock the casing non-rotatably relative to the input part of the damper assembly.

* * * * *